US008565497B2

(12) United States Patent  (10) Patent No.: US 8,565,497 B2
Nada et al.  (45) Date of Patent: Oct. 22, 2013

(54) BIOMETRIC AUTHENTICATION DEVICE, BIOMETRIC AUTHENTICATION METHOD AND COMPUTER PROGRAM FOR BIOMETRIC AUTHENTICATION, AND BIOMETRIC INFORMATION REGISTRATION DEVICE

(71) Applicant: Fujitsu Limited, Kawasaki (JP)

(72) Inventors: Hajime Nada, Kawasaki (JP); Yukihiro Abiko, Kawasaki (JP); Kazuya Uno, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/752,586

(22) Filed: Jan. 29, 2013

(65) Prior Publication Data

US 2013/0142405 A1  Jun. 6, 2013

Related U.S. Application Data

(63) Continuation of application No. PCT/JP2010/062834, filed on Jul. 29, 2010.

(51) Int. Cl.
*G06K 9/00* (2006.01)
*H04Q 1/00* (2006.01)

(52) U.S. Cl.
USPC ........... 382/124; 340/5.53; 382/125; 382/115

(58) Field of Classification Search
None
See application file for complete search history.

(56) References Cited

U.S. PATENT DOCUMENTS 5,493,621 A  2/1996 Matsumura
5,901,239 A *  5/1999 Kamei .......................... 382/125
5,982,914 A *  11/1999 Lee et al. ...................... 382/124
7,236,617 B1 *  6/2007 Yau et al. ...................... 382/125
7,545,959 B2 *  6/2009 Houle et al. .................. 382/115
7,555,487 B2 *  6/2009 Levi et al. ........................ 1/1

(Continued)

FOREIGN PATENT DOCUMENTS

JP  7-110860  4/1995
JP  9-44666  2/1997

(Continued)

OTHER PUBLICATIONS

Chen et al. "Beyond Minutiae: A Fingerprint Individuality Model with Pattern, Ridge, and Pore Features," 2009.*
Vlachos et al. "Vein Segmentation in Infrared Images Using Compound Enhancing and Crisp Clustering." 2008.*

(Continued)

*Primary Examiner* — Anand Bhatnagar
*Assistant Examiner* — Alexander J Lesnick
(74) *Attorney, Agent, or Firm* — Staas & Halsey LLP

(57)  ABSTRACT

A biometric authentication device including: a biometric information acquiring unit which generates a biometric input image representing user's biometric input information; and a processing unit. The processing unit extracts, for each block obtained by dividing the biometric input image, a local feature representing the geometric feature of the biometric input information; classifies the plurality of blocks into a plurality of groups by blocks with a similar local feature; extracts a second group feature representing feature of biometric input information for each group; calculates the degree of difference between each of registered biometric information and the biometric input information based on a first group feature for each group set for a registered biometric image representing the registered biometric information and the second group feature; selects a prescribed number of registered biometric information based on the degree of the difference; and matches the selected registered biometric information with the biometric input information.

19 Claims, 12 Drawing Sheets

(56) References Cited

U.S. PATENT DOCUMENTS

| | | | |
|---|---|---|---|
| 8,300,904 B2 * | 10/2012 | Chen et al. | 382/124 |
| 8,428,310 B2 * | 4/2013 | Hall et al. | 382/115 |
| 2004/0022440 A1 * | 2/2004 | Akahori | 382/224 |
| 2004/0125993 A1 * | 7/2004 | Zhao et al. | 382/124 |
| 2004/0218791 A1 * | 11/2004 | Jiang et al. | 382/124 |
| 2007/0047784 A1 * | 3/2007 | Hara | 382/125 |
| 2008/0240515 A1 * | 10/2008 | Uno et al. | 382/115 |
| 2009/0169072 A1 * | 7/2009 | Lo et al. | 382/125 |
| 2009/0268951 A1 * | 10/2009 | Zhang et al. | 382/115 |
| 2012/0189170 A1 * | 7/2012 | Uno et al. | 382/115 |
| 2012/0195475 A1 * | 8/2012 | Abiko | 382/115 |
| 2013/0004032 A1 * | 1/2013 | Abiko | 382/124 |

FOREIGN PATENT DOCUMENTS

| | | |
|---|---|---|
| JP | 2001-243465 | 9/2001 |
| JP | 2004-145447 | 5/2004 |
| JP | 2004-272501 | 9/2004 |
| JP | 2007-65900 | 3/2007 |
| JP | 2009-123234 | 6/2009 |

OTHER PUBLICATIONS

Wang et al. "Minutiae feature analysis for infrared hand vein pattern biometrics," 2007.*

Biswas et al. "Exploring Ridge Curvature for Fingerprint Indexing," 2008.*

Ross et al. "Augmenting Ridge Curves with Minutiae Triplets for Fingerprint Indexing," 2006.*

Nagaty "On learning to estimate the block directional image of a fingerprint using a hierarchical neural network." 2002.*

Cappelli, et al. "Fingerprint Classification by Directional Image Partitioning," 1999.*

Wang et al. "Fingerprint Classification Based on Curvature Sampling and RBF Neural Networks," 2005.*

Nagaty "Fingerprints classification using artificial neural networks: a combined structural and statistical approach," 2001.*

Fang. et al. "Generative Models for Fingerprint Individuality using Ridge Types," 2007.*

International Search Report for Corresponding PCT Application PCT/JP2010/062834 mailed Aug. 31, 2010.

* cited by examiner

FIG.7

| GROUP | $g_1$ | $g_2$ | $g_3$ | $g_4$ | $g_5$ |
|---|---|---|---|---|---|
| REGISTERED BIOMETRIC IMAGE | LOW (0) | MIDDLE (1/5 BLOCK) | HIGH (2/7 BLOCK) | HIGH (1/2 BLOCK) | LOW (0) |
| BIOMETRIC INPUT IMAGE 600 | LOW (0) | MIDDLE (1/4 BLOCK) | LOW (0) | HIGH (1/2 BLOCK) | LOW (0) |
| BIOMETRIC INPUT IMAGE 610 | LOW (0) | MIDDLE (1/4 BLOCK) | LOW (0) | HIGH (1/2 BLOCK) | LOW (0) |
| BIOMETRIC INPUT IMAGE 620 | LOW (0) | MIDDLE (1/4 BLOCK) | HIGH (2/5 BLOCK) | HIGH (1/2 BLOCK) | LOW (0) |

700

BIOMETRIC AUTHENTICATION DEVICE, BIOMETRIC AUTHENTICATION METHOD AND COMPUTER PROGRAM FOR BIOMETRIC AUTHENTICATION, AND BIOMETRIC INFORMATION REGISTRATION DEVICE

CROSS-REFERENCE TO RELATED APPLICATION

This application is a continuation application and is based upon PCT/JP2010/62834, filed on Jul. 29, 2010, the entire contents of which are incorporated herein by reference.

FIELD

The present invention relates to, for example, a biometric authentication device, a biometric authentication method and a computer program for biometric authentication which extracts a feature from biometric information represented by a biometric image and utilizes the feature for biometric authentication, and a biometric information registration device which registers biometric information utilized for biometric authentication.

BACKGROUND

Recent years have seen the development of biometric authentication technology for authenticating a user of an device or system based on a biometric image representing the user's biometric information such as a hand or finger vein pattern or a fingerprint or palm print. A biometric authentication device using such biometric authentication technology acquires, as a biometric input image, a biometric image representing, for example, the biometric information of the user who wishes to use the biometric authentication device. Then, the biometric authentication device compares the user's biometric input information represented by the biometric input image with registered biometric information, i.e., biometric information presented in a biometric image for each registered user. When the result of the comparison indicates that the biometric input information matches the registered biometric information, the biometric authentication device authenticates the user as being a legitimate registered user. The biometric authentication device then permits the authenticated user to use the device in which the biometric authentication device is incorporated or some other device connected to the biometric authentication device.

In such a biometric authentication device, biometric input information is matched with registered biometric information by, for example, extracting the feature from the biometric input information and comparing the feature with the feature extracted from the registered biometric information (see, for example, Japanese Laid-open Patent Publication No. 2007-65900, Japanese Laid-open Patent Publication No. 2001-243465 Japanese Laid-open Patent Publication No. 7-110860 and Japanese Laid-open Patent Publication No. 9-44666).

In such a known art, a fingerprint image is divided into a plurality of zones and a ridge line direction in each of the zones is extracted.

In another known art, a fingerprint image matching device divides an input fingerprint ridge line image and a registered fingerprint ridge line image into a plurality of blocks respectively, and a ridge line direction is obtained for each of the blocks. The fingerprint image matching device determines a rotational component and a translational component which provide an optimum superposition between the ridge line direction distribution in the input fingerprint ridge line image and the ridge line direction distribution in the registered fingerprint ridge line image. Then, the fingerprint image matching device carries out matching between the input fingerprint ridge line image and the registered fingerprint ridge line image which have been converted by using the rotational component and translational component.

In still another known art, a fingerprint matching method carries out matching between a registered fingerprint and an input fingerprint by comparing ridge line direction pattern and curvature pattern of the registered fingerprint with ridge line direction pattern and curvature pattern of the input fingerprint.

In still another known art, a device for classifying fingerprint patterns judges types of dermatoglyphic pattern by tracing a feature line of a dermatoglyphic pattern based on a singular minutia which is not associated with minutiae of ridges and valleys extracted from a skin image and by using the result of tracing.

The biometric authentication technology includes a so-called 1:1 authentication procedure and 1:N authentication procedure. In a 1:1 authentication procedure, together with user's biometric input information, user's identification information such as a user name or an identification number is input and thus only registered biometric information which is preregistered for the user is specified. Then the biometric authentication device matches the biometric input information only with the specified registered biometric information.

On the other hand, in a 1:N authentication procedure, user's identification information is not input to a biometric authentication device and it is difficult to specify registered biometric information corresponding to the user. For this reason, the biometric authentication device matches the biometric input information with all of the registered biometric information which is preregistered. Then, the biometric authentication device authenticates the user as a registered user corresponding to the registered biometric information which matches the most the biometric input information. Accordingly, the larger the registered biometric information, the larger the number of runs of the matching process. This inevitably takes longer time for the biometric authentication process. In particular, when a biometric authentication technology is used in a large-scale system, the number of registered user is sometimes very large. When such a large-scale system employs a server-client system, in order to carry out a biometric authentication process, accesses to a server is concentrated to increase the load of the server, which sometimes may prolong the waiting time from when the user inputs biometric information until the result of the authentication is obtained.

From the viewpoint of simplicity of use for a user, however, time for a biometric authentication process is preferably short. Therefore, a technique which limits the registered biometric information utilized for matching with biometric input information is proposed (see, for example, Japanese Laid-open Patent Publication No. 2004-145447).

In such a known art, a fingerprint matching device selects a registered fingerprint which matches the input fingerprint by comparing the value of the parameter for selection representing the feature of an input fingerprint with a parameter for selection of a plurality of registered fingerprint and matches selected registered fingerprint with the input fingerprint. As the parameters for selection, the percentage of ridge line region to the whole fingerprint region, the space between a ridge line and a valley line, the number of weighted feature points, and the values of the ridge directions at a plurality of feature points each of which ridge directions is weighted by the confidence level of the feature point.

SUMMARY

In recent years, a slide-type sensor or an area sensor with a small readout area has been developed. When biometric information is scanned by using such a slide-type sensor or an area sensor, only a part of the biometric information may be contained on the image. Therefore, the region of biometric information contained in a registered biometric image which is acquired at the time of registration of the biometric information may be not completely matched with the region of the biometric information contained in the biometric input image which is acquired at the time of matching. For this reason, the value of a parameter for selection obtained from the biometric input image may differ from the value of a parameter for selection obtained from the registered biometric image, and the registered biometric information may not appropriately be selected.

According to one embodiment, a biometric authentication device is provided. The biometric authentication device includes: a biometric information acquiring unit which acquires biometric input information of a user and generates a biometric input image representing the biometric input information; a storage unit which stores, for each of first prescribed number of registered users which have been pre-registered, and stores, for each of a plurality of groups, a first group feature representing a feature of registered biometric information contained in the group, the plurality of groups being obtained by dividing a registered biometric image representing the registered biometric information of a registered user into a plurality of blocks, and classifying the plurality of blocks so that blocks which contain geometric features of the registered biometric information which are similar to each other, are classified into a same group; and a processing unit. The processing unit implements: a dividing function which divides the biometric input image into a plurality of blocks; a local feature extracting function which extracts, for each of the plurality of blocks in the biometric input image, a local feature representing a geometric feature of the biometric input information contained in the block; a grouping function which classifies the plurality of blocks in the biometric input image into the plurality of groups by blocks with the similar local feature; an extracting function which extracts, for each of the plurality of groups in the biometric input image, a second group feature representing the feature of the biometric input information contained in the group; a selecting function which calculates, from the plurality of groups set for the biometric input image and the plurality of groups set for each of a plurality of the registered biometric images, the difference between the second group feature and the first group feature for each group with the similar local feature, and calculates, depending on the difference, the degree of difference between each of the plurality of registered biometric information and the biometric input information, and selects a second prescribed number, which is smaller than the first prescribed number, of registered biometric information in the ascending order of the degree of the difference; and a matching function which matches the selected registered biometric information with the biometric input information.

According to another embodiment, a biometric information registration device is provided. The biometric information registration device includes: a biometric information acquiring unit which acquires user's registered biometric information and generates a registered biometric image representing the registered biometric information; a storage unit; and a processing unit. The processing unit implements: a dividing function which divides the registered biometric image into a plurality of blocks; a local feature extracting function which extracts, for each of the plurality of blocks, a local feature representing the geometric feature of the registered biometric information contained in the block; a grouping function which classifies the plurality of blocks into a plurality of groups by blocks with a similar local feature; a group feature extracting function which extracts, for each of the plurality of groups, a first group feature representing the feature of the registered biometric information contained in the group; and a registration function which stores the first group feature extracted for each of the plurality of groups in the storage unit together with identification information of the registered biometric information.

According to still another embodiment, a biometric authentication method is provided. The biometric authentication method includes: acquiring user's biometric input information and generating a biometric input image representing the biometric input information; dividing the biometric input image into a plurality of blocks; extracting, for each of the plurality of blocks, a local feature representing a geometric feature of the biometric input information contained in the block; classifying the plurality of blocks into the plurality of groups by blocks with a similar local feature; extracting, for each of the plurality of groups, a second group feature representing the feature of the biometric input information contained in the group; calculating, from the plurality of groups set for the biometric input image and the plurality of groups set for each of a first prescribed number of the registered biometric images stored in a storage unit, a difference between a first group feature representing the feature of the registered biometric information in the group in the registered biometric image and the second group feature, for each group with the similar local feature; calculating, depending on the difference, the degree of difference between each of the plurality of registered biometric information and the biometric input information, and selecting a second prescribed number, which is smaller than the first prescribed number, of registered biometric information in the ascending order of the degree of the difference; and matching the selected registered biometric information with the biometric input information.

According to still another embodiment, a computer program for biometric authentication to cause a computer to execute a biometric authentication process is provided. The computer program causes a computer to execute: dividing a biometric input image representing user's biometric input information generated by a biometric information acquiring unit into a plurality of blocks; extracting, for each of the plurality of blocks, a local feature representing a geometric feature of the biometric input information contained in the block; classifying the plurality of blocks into a plurality of groups by blocks with a similar local feature; extracting, for each of the plurality of groups, a second group feature representing the feature of the biometric input information contained in the group; calculating, from the plurality of groups set for the biometric input image and the plurality of groups set for each of a first prescribed number of the registered biometric images stored in a storage unit, a difference between a first group feature representing the feature of the registered biometric information in the group in the registered biometric image and the second group feature, for each group with the similar local feature; calculating, depending on the difference, the degree of difference between each of the plurality of registered biometric information and the biometric input information, and selecting a second prescribed number, which is smaller than the first prescribed number, of registered biometric information in the ascending order of the degree of the difference; and matching the selected registered biometric information with the biometric input information.

The object and advantages of the invention will be realized and attained by means of the elements and combinations particularly pointed out in the Claims.

It is to be understood that both the foregoing general description and the following detailed description are exemplary and explanatory and are not restrictive of the invention, as claimed.

BRIEF DESCRIPTION OF DRAWINGS

FIG. 7 illustrates a list of minutiae densities of groups each obtained for the registered biometric image illustrated in FIG. 4 and minutiae densities of groups each obtained for each of the registered biometric images illustrated in FIGS. 6A to 6C.

DESCRIPTION OF EMBODIMENTS

A biometric authentication device according to a first embodiment will be described with reference to the drawings.

The biometric authentication device acquires a biometric input image which is an image representing user's biometric information for carrying out a biometric authentication process for the user. The biometric authentication device divides the biometric input image into a plurality of blocks and extracts, for each of the blocks, geometric local feature of the biometric information, in particular, a feature which is rotation invariant and shift invariant. The biometric authentication device groups each of the blocks into blocks with a similar local feature. The biometric authentication device also extracts a group feature which is a second feature for each of the groups. Then, the biometric authentication device compares a group feature for each group calculated for the biometric input image with a group feature for each group calculated for each of a plurality of registered biometric images containing biometric information of a preregistered registered user. Based on the result of the comparison, the biometric authentication device can appropriately select a registered biometric image which is an object of a matching process even when only a part of the user's biometric information is contained in the biometric input image by selecting, from a plurality of registered biometric images, a registered biometric image which is an object of a matching process.

In the present embodiment, the biometric authentication device utilizes as biometric information which is an object of biometric authentication a fingerprint of a finger. The biometric information which is an object of biometric authentication may be, however, other biometric information presented on a still image such as a palm print, a nose pattern, a vein pattern, a shape of a palm, faces, and an auricle or a retinal pattern.

In this specification, the term "matching process" is used for referring to a process of calculating the degree of similarity representing the level of similarity between biometric input information and registered biometric information. The term "biometric authentication process" is used not only for referring to a matching process but for referring to an overall authentication process including a process of deciding to authenticate a user or not by utilizing the result of the matching process.

Figure 1:
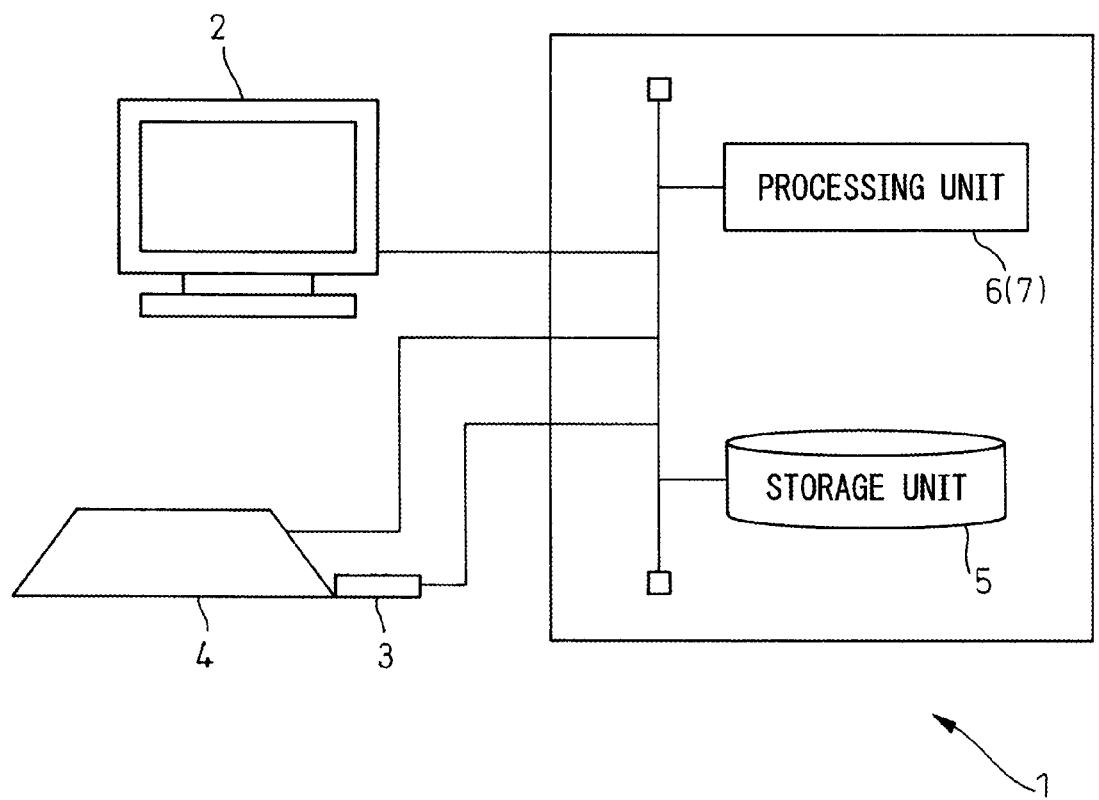
FIG. 1 is a diagram schematically illustrating a biometric authentication device according to a first embodiment.

FIG. 1 represents a diagram schematically illustrating a biometric authentication device. As illustrated in FIG. 1, a biometric authentication device 1 includes a display unit 2, a biometric information acquiring unit 3, an input unit 4, a storage unit 5 and a processing unit 6. The biometric authentication device 1 generates a biometric input image representing a fingerprint of a user's finger by the biometric information acquiring unit 3 and carries out a biometric authentication process by using the biometric input image. As the result of the biometric authentication process, when the user is authenticated as any one of registered users, the biometric authentication device 1 permits the user to use a device provided with the biometric authentication device 1. Alternatively, the biometric authentication device 1 transmits, to another device which is not illustrated, a signal that the user has been authenticated and permits the user to use the device.

The display unit 2 includes a display device such as a liquid crystal display or a CRT monitor. The display unit 2 displays to the user a guidance message for placing a finger on a position where the biometric information acquiring unit 3 can acquire an appropriate biometric input image. The display unit 2 also displays various kinds of information associated with an application performed by the processing unit 6.

The biometric information acquiring unit 3 generates a biometric image representing a fingerprint of the user. For this purpose, the biometric information acquiring unit 3 includes, for example, a slide-type fingerprint sensor. This fingerprint sensor may be, for example, a sensor employing any one of optical, capacitive, electric field and thermal methods. The biometric information acquiring unit 3 may include any fingerprint sensor utilizing an area sensor. The biometric information acquiring unit 3 passes a generated biometric image to the processing unit 6.

The biometric information acquiring unit 3 may be formed integrally with the display unit 2 or the input unit 4.

The input unit 4 includes a user interface such as a keyboard, a mouse or a touch-pad. A command, data, or the user name of a user input by the user via the input unit 4 is passed to the processing unit 6. When the user does not need to input information other than biometric information, the input unit 4 may be omitted.

The storage unit 5 includes at least one of, for example, a semiconductor memory, a magnetic disk device, or an optical disk device. The storage unit 5 stores an application program used in the biometric authentication device 1, the user name, the user identification number and personal setting information of at least one registered user, various data and so on. The storage unit 5 stores a program for executing a biometric authentication process. Further, the storage unit 5 stores, for each registered user, data related to a fingerprint of a specified finger which is registered biometric information of the registered user. The data related to the registered biometric information includes a feature for selection and a feature for matching. The feature for matching includes, for example, the type and the position of a singular point such as delta singular point or center of whorl, the local ridge line direction, and the type and the position of a minutiae such as ridge endings or ridge bifurcation extracted from a registered biometric image which is an image representing the registered biometric information. Alternatively, the feature for matching may be a registered biometric image or a part of a registered biometric image. The feature for selection is a group feature which is used for selecting registered biometric information which matches biometric input information which is biometric information of a user acquired at the time of matching. The detail of the group feature is described below.

The processing unit 6 includes one or more processors and a peripheral circuit thereof. The processing unit 6 carries out a biometric authentication process using a biometric input image representing biometric input information which is a fingerprint of the user acquired from the biometric information acquiring unit 3. The processing unit 6 carries out biometric information registration process which registers the registered biometric information which is a fingerprint of a registered user.

Figure 2:
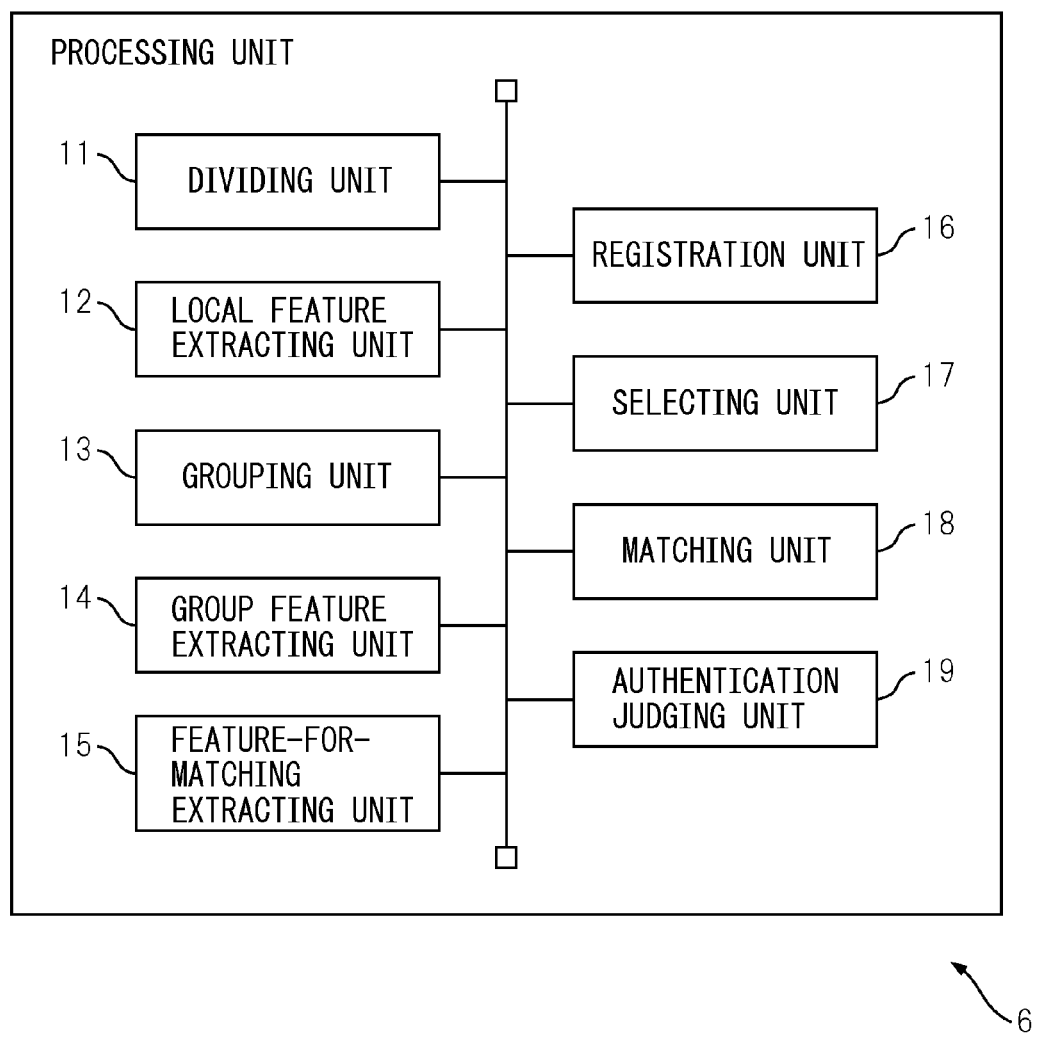
FIG. 2 is a functional block diagram of a processing unit which a biometric authentication device according to a first embodiment includes.

FIG. 2 is a functional block diagram of the processing unit 6. As illustrated in FIG. 2, the processing unit 6 includes a dividing unit 11, a local feature extracting unit 12, a grouping unit 13, a group feature extracting unit 14, a feature for matching extracting unit 15, a registration unit 16, a selecting unit 17, a matching unit 18 and an authentication judging unit 19. Each of these units that the processing unit 6 includes is a functional module implemented by a computer program executed on a processor that the processing unit 6 includes. Alternatively, each of these units that the processing unit 6 includes may be implemented on the biometric authentication device 1 as a firmware.

(Biometric Information Registration Process)

First, a biometric information registration process which registers biometric information of a registered user as registered biometric information is described.

The dividing unit 11 divides a registered biometric image acquired from the biometric information acquiring unit 3 into a plurality of blocks. Each of the plurality of blocks is, for example, a rectangle, an equilateral triangle or a hexagon. In order for each of the blocks to contain a part of a plurality of ridge lines, the length of each side of each of the blocks is preferably set to several times a representative value (about 0.2 mm) of the space between adjacent ridge lines on a finger of an adult, for example, a number of pixels equivalent to 0.4 mm.

The dividing unit 11 may set a plurality of oblong blocks arranged such that the ridge line direction on the registered biometric image and the longitudinal direction of the blocks are substantially in parallel. The dividing unit 11 obtains a ridge line direction on the registered biometric image in order to arrange the blocks along the ridge line direction. For this purpose, the dividing unit 11, for example, binarizes the registered biometric image into pixels corresponding to the ridge line and pixels corresponding to the valley line. The dividing unit 11 applies thinning to the pixels corresponding to the ridge line over the whole registered biometric image. Then the dividing unit 11, for example, divides the registered biometric image into a plurality of regions, and defines the average value of the tangential directions of a plurality of lines in which pixels corresponding to the ridge line in each of the regions are connected as a ridge line direction in each of the regions.

The dividing unit 11 sets an oblong block in each of the regions such that the ridge line direction and the longitudinal direction in each of the regions are substantially in parallel. For example, the dividing unit 11 sets an oblong block such that the center of the oblong is the center of the region. In this case, for example, the length of the side of the block which is orthogonal to the ridge line direction may be set to a length corresponding to the total of the widths of two ridge lines and the width of one valley line. The length of the side of the block which is in parallel to the ridge direction may be set to several times, for example, twice the length of the side which is orthogonal to the ridge line direction.

The size of each of the regions is larger than that of the block and preferably is the size such that, for example, a plurality of blocks are contained in one region.

The dividing unit 11 notifies the local feature extracting unit 12 of block position information representing the position and the range of each of the blocks (for example, the coordinates of the left upper end point and the lower right end point of each of the blocks, or the distance between the centroid of each of the blocks and the corners).

The local feature extracting unit 12 extracts a local feature from each of the blocks of a registered biometric image as a standard for determining a group of a block for obtaining a feature for selection.

The position of biometric information contained in the biometric image differs depending on the positional relationship between a finger of a user and the biometric information acquiring unit 3. Therefore, the positional relationship at the time of registration between the finger of the user and the biometric information acquiring unit 3 sometimes differs from the positional relationship at the time of matching between the finger of the user and the biometric information acquiring unit 3. In particular, when a sensor that the biometric information acquiring unit 3 includes is a sensor which only can take an image of a part of region of a fingerprint at one time such as a slide-type sensor, it is difficult to match the above-mentioned positional relationship at the time of registration with the above-mentioned positional relationship at the time of matching.

For this reason, the local feature is preferably a value determined only by the geometric pattern of the fingerprint in the block regardless of the positional relationship between the finger of the user and the biometric information acquiring unit 3. In other words, the local feature is preferably a geometric feature which is rotation invariant and shift invariant in the registered biometric image. In the present embodiment, the local feature extracting unit 12 obtains the curvature of a ridge line as the local feature for each of the blocks.

In order to obtain the curvature of the ridge line of the focused block of a registered biometric image, the local feature extracting unit 12, for example, binarizes pixel values in the focused block and distinguishes a pixel representing a ridge line and a pixel representing a valley line. The threshold for binarization can be set to, for example, the average value of the pixel values in the focused block. Next, the local feature extracting unit 12 thins a line in which pixels representing a ridge line are connected into a line with a width of, for example, one pixel by applying thinning to pixels having a value corresponding to a ridge line for the binarized focused block.

Then, the local feature extracting unit 12 sets the average value of the tangential direction of a line in which pixels representing a ridge line in the focused block as the ridge line direction in the focused block. The local feature extracting unit 12 obtains the curvature of a ridge line in the focused block from the differences between the ridge line directions of two blocks adjacent to the both sides of the focused block along the ridge line direction of the focused block and the ridge line direction of the focused block.

Alternatively, the local feature extracting unit 12 regards each of the thinned ridge lines in the focused block as an arc and obtains the curvature of the arc from three coordinates on the ridge line. Then the local feature extracting unit 12 sets the average value of the curvature of each of the ridge lines in the focused block to the curvature of the ridge line of the focused block. The local feature extracting unit 12 may obtain a weighted average of the curvature depending on the length of each of the ridge lines. Alternatively, the local feature extracting unit 12 may set the curvature obtained with respect to the longest ridge line in the focused block to the curvature of the ridge line of the focused block.

Figure 3:
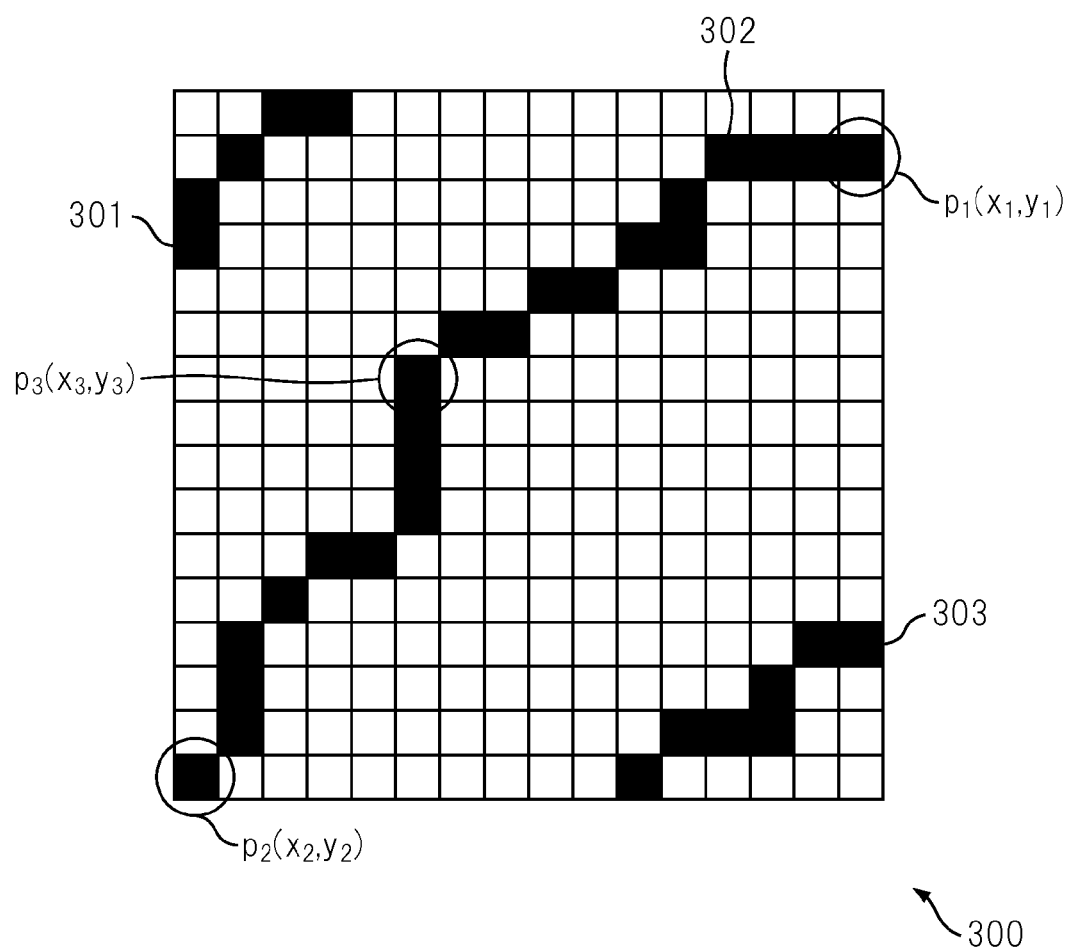
FIG. 3 is a diagram illustrating one example of a block containing a thinned ridge line.

FIG. 3 illustrates one example of a block which contains a thinned ridge line. In a block 300, lines 301 to 303 individually represent a thinned ridge line. The local feature extracting unit 12 calculates a curvature C of the ridge line 302, by using, for example, the coordinates of the both end points $p_1$ $(x_1, y_1)$, $p_2$ $(x_2, y_2)$ and the middle point $(x_3, y_3)$ of the longest ridge line 302, according to the following equation:

$$C = \frac{\sqrt{(a+b+c)(-a+b+c)(a-b+c)(a+b-c)}}{abc} \quad (1)$$

where $$a = \sqrt{(x_1 - x_2)^2 + (y_1 - y_2)^2}$$
$$b = \sqrt{(x_2 - x_3)^2 + (y_2 - y_3)^2}$$
$$c = \sqrt{(x_3 - x_1)^2 + (y_3 - y_1)^2}.$$

As the local feature, the local feature extracting unit 12 may calculate, in place of the curvature of a ridge line, the curvature of a valley line or the curvature of the edge between the valley line and the ridge line. The local feature extracting unit 12 can calculate the curvature of a valley line by applying the same method as the method of obtaining the curvature with respect to the above-mentioned ridge line to a valley line. The local feature extracting unit 12 can detect a pixel corresponding to the edge between the valley and the ridge line by performing an edge detection process by using an edge detection filter such as a sobel filter to a binarized focused block. The local feature extracting unit 12 can calculate the curvature of the edge by applying the same method as the method of obtaining the curvature with respect to the above-mentioned ridge line to the edge line for each edge line in which pixels corresponding to the edge are connected.

Alternatively, the local feature extracting unit 12 may set the average value of the differences of the tangential directions at two points spacing a predetermined distance on the same ridge line in a focused block to a local feature. Similarly, the local feature extracting unit 12 may set the average value of the differences of the tangential directions at two points spacing a predetermined distance on the same valley line or on the same edge line in a focused block to a local feature. The predetermined distance is set to, for example, half to two thirds of the length of the side of a focused block. Still further, the local feature extracting unit 12 may obtain another geometric feature of a fingerprint which is rotation invariant and shift invariant as a local feature.

The local feature extracting unit 12 may judge that a block in which the local feature is appropriately calculated does not contain biometric information. Since the local feature extracting unit 12 is hard to precisely separate a ridge line from a valley line when, for example, the difference between the maximum value and the minimum value of the pixel value in the block is small (for example, the difference is fifth the difference between the maximum value and the minimum value of the whole biometric image or smaller), the local feature extracting unit 12 judges that the block does not contain biometric information. The local feature extracting unit 12 sets the value of the local feature of the block in which biometric information is not contained to a value which represents that biometric information is not contained. For example, when the local feature is a curvature, the local feature extracting unit 12 sets the value of the local feature of the block in which biometric information is not contained to a negative value.

The local feature extracting unit 12 passes the local feature of each block to the grouping unit 13 together with corresponding block position information.

The grouping unit 13 groups a plurality of blocks in a registered biometric image into blocks with a similar local feature.

In the present embodiment, the grouping unit 13 classifies the curvature of the ridge line obtained as a local feature into five stages. For example, thresholds $C_1$ to $C_4$ which classify the curvature of the ridge line are listed in the Table 1 below.

TABLE 1

Example of grouping threshold

| Threshold | $C_1$ | $C_2$ | $C_3$ | $C_4$ |
|---|---|---|---|---|
| Value | 0.025 | 0.05 | 0.1 | 0.2 |

The resolution of the registered biometric image is 500 dpi.

The grouping unit 13 classifies, among a plurality of blocks set for a registered biometric image, a block having a curvature of a ridge line of smaller than the threshold $C_1$ into a group $g_1$. The grouping unit 13 classifies a block having a curvature of a ridge line of not smaller than the threshold $C_1$ and smaller than the threshold $C_2$ into a group $g_2$. In the same manner, the grouping unit 13 classifies a block having a curvature of a ridge line of not smaller than the threshold $C_2$ and smaller than the threshold $C_3$ into a group $g_3$. Likewise, the grouping unit 13 classifies a block having a curvature of a ridge line of not smaller than the threshold $C_3$ and smaller than the threshold $C_4$ into a group $g_4$. Lastly, the grouping unit 13 classifies a block having a curvature of a ridge line of not smaller than the threshold $C_4$ into a group $g_5$.

Note that the grouping unit 13 does not classify a block whose value of the local feature represents that biometric information is not contained into any of the groups.

The grouping unit 13 can classify each of the blocks into any of the five groups by using the above-mentioned thresholds $C_1$ to $C_4$ even when the local feature is the curvature of a valley line or the curvature of the edge between the valley line and the ridge line.

The number of the groups which classify the blocks is not limited to five. The number of the groups may be any number as long as the number is a sufficient number in which blocks with a similar local feature can be classified into the same group, and the number may be set to any number, for example, two or more, or half the total number of the blocks or less.

Figure 4:
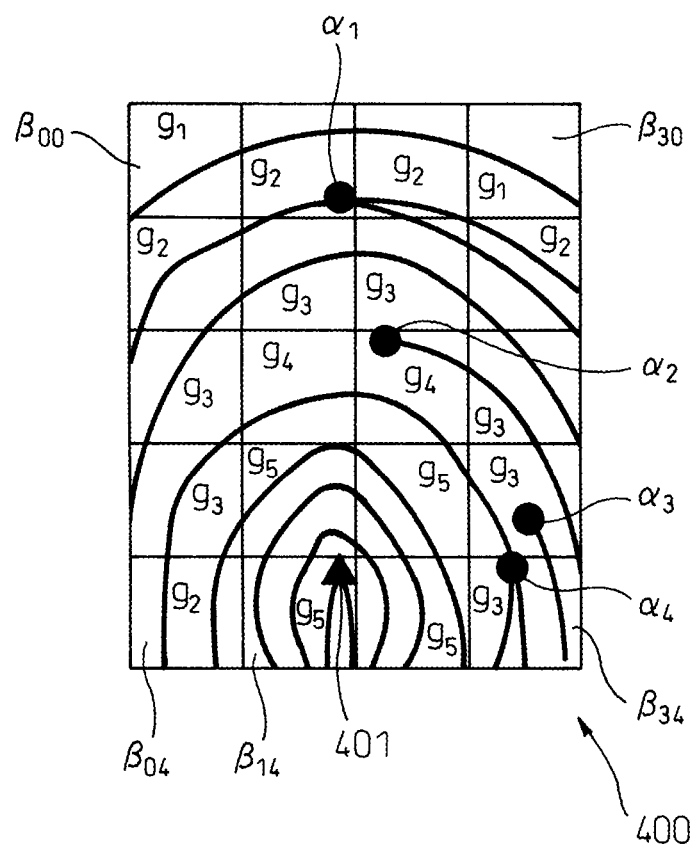
FIG. 4 is a diagram illustrating one example of a group in which a plurality of blocks in a registered biometric image are classified.

FIG. 4 illustrates an example in which a plurality of blocks in a registered biometric image are classified into five groups. A registered biometric image 400 illustrated in FIG. 4 is divided into a horizontally four columns×vertically five rows block $B_{ij}$ (i=0 to 3, j=0 to 4). Each of the groups $g_1$ to $g_5$ represents one group. The curvature of a ridge line in a block contained in the group $g_1$ is the smallest, and the curvature of a ridge line in a block contained in the group $g_5$ is the largest.

In this example, a vortex core 401 of a fingerprint is positioned at a block $B_{14}$. Accordingly, the closer a block is to the block $B_{14}$, the larger the curvature of a ridge line in the block. As the result, the blocks are grouped substantially concentrically around the block $B_{14}$. In this manner, regions having a similar characteristic (in this example, the distance from the vortex core) in a whole fingerprint are grouped into one group.

The grouping unit 13 associates the block position information of each of the blocks with a group identification number representing the group that the block is classified into. The group identification number has a value corresponding to the value of the local feature of a block belonging to the group. The grouping unit 13 passes the block position information and group identification number of each of the group to the group feature extracting unit 14.

The group feature extracting unit 14 extracts a feature representing a characteristic of biometric information for each group as a group feature for selecting registered biometric information used for matching with biometric input information acquired at the time of matching. As mentioned above, the positional relationship at the time of registration between a finger of a user and the biometric information acquiring unit 3 sometimes differs from the positional relationship at the time of matching between the finger of the user and the biometric information acquiring unit 3. The group feature is preferably rotation invariant and shift invariant.

In the present embodiment, the group feature extracting unit 14 obtains as the group feature, the number of minutiae such as ridge bifurcation or ridge ending per unit area for each group. In the following, the number of minutiae per unit area is referred to as a minutiae density. The minutiae density is a feature which is rotation invariant and shift invariant.

The group feature extracting unit 14 generates a binarized image in which a ridge line is thinned from a registered biometric image in order to extract a ridge bifurcation point and a ridge ending from each group. By using a plurality of mask pattern and scanning a thinned registered biometric image, the group feature extracting unit 14 detects the position thereof in the registered biometric image at the time of matching with any of the mask pattern. Then the group feature extracting unit 14 extracts the center pixel of the detected position as a minutia. The mask pattern is represented by, for example, 3×3 pixel, and has a binary pattern corresponding to the bifurcation point or end point of a ridge line.

The group feature extracting unit 14 counts the number of the extracted minutiae for each group. The group feature extracting unit 14 obtains the minutiae density by dividing the number of minutiae by the area of the group for each group. The unit area may be set to, for example, the area per one block. In this case, the group feature extracting unit 14 can obtain the minutiae density for the specified group by dividing the number of minutiae of the specified group by the number of blocks contained in the specified group. The unit area may also be the area per one pixel. In this case, the group feature extracting unit 14 can obtain the minutiae density for the specified group by dividing the number of minutiae of the specified group by the number of pixels contained in the specified group.

Further, in place of setting the minutiae density per se to a group feature, the group feature extracting unit 14 may set a plurality of sections for the minutiae density and set the section to which the minutiae density of each group belongs to the group feature. For example, for the minutiae density, three types of sections "low", "middle", "high" may be set. The "low" section corresponds to, for example, that the minutiae density is 0/block. The "middle" section corresponds to, for example, that the minutiae density is not lower than 0/block and smaller than ⅓/block. Further, the "high" section corresponds to, for example, that the minutiae density is ⅓/block or higher. The group feature extracting unit 14 assigns, for example, values of '0', '1' and '2' as group feature quantities to sections of "low", "middle" and "high", respectively. In this manner, the value of a selected feature with respect to each section is set such that the larger the difference between minutiae densities between focused two sections, the larger the difference between the values assigned to the two sections.

When a registered biometric image is binarized into pixels representing a ridge line and pixels representing a valley line, the group feature extracting unit 14 may set the ratio of pixels representing the ridge line to the total number of pixels of the group to a group feature. Alternatively, the group feature extracting unit 14 may set the average value of the ridge line width, the average value of spaces between center lines of adjacent ridge lines or the number of sweat glands present on the ridge line per unit area for each group to a group feature. For example, the sweat gland can be detected as a pixel surrounded by pixels representing a ridge line by binarizing the registered biometric image.

The group feature extracting unit 14 passes the group feature obtained for each group to the registration unit 16 together with the identification number of the group.

The feature for matching extracting unit 15 extracts, for example, a minutia as a feature for matching. In this case, the feature for matching extracting unit 15 extracts a minutia from the whole registered biometric image by performing the same process as the process in which the group feature extracting unit 14 extracts a minutia. The feature for matching extracting unit 15 may extract a minutia from the registered biometric image by using any other known method in which an end point or bifurcation point of a ridge line is obtained as a minutia. Further, the feature for matching extracting unit 15 obtains the position of the extracted minutia and the ridge line direction in the vicinity of the minutia as feature quantities for matching. The feature for matching extracting unit 15 can utilize any known method for obtaining a ridge line direction in order to obtain the ridge line direction in the vicinity of the minutia.

Alternatively, the feature for matching extracting unit 15 may set a part of region cut out from the registered biometric image to a feature. In this case, the cut out region preferably contains a singular point such as a vortex core or delta of a fingerprint. The feature for matching extracting unit 15 can detect a singular point by, for example, performing a pattern matching between a mask pattern corresponding to the singular point and the registered biometric image in the same manner as detecting a minutia. The feature for matching extracting unit 15 passes the extracted feature for matching to the registration unit 16.

The registration unit 16 acquires the user name of a registered user from the input unit 4. The registration unit 16 assigns to the registered user a user identification number discernible from other registered users. The registration unit 16 associates the user identification number assigned to the registered user with the user name, the group feature of each group extracted from the registered biometric image of the registered user and the feature for matching. The registration unit 16 writes a group feature and feature for matching together with the user identification number and user name of the registered user into the storage unit 5. By this, each group feature and feature for matching is associated with the registered biometric information of the corresponding registered user.

The registration unit 16 may acquire a personal identification number of the registered user via the input unit 4. In this case, the registration unit 16 also associates the personal identification number with the user identification number of the registered user and writes the personal identification number into the storage unit 5. It is noted that each of the user identification number, user name of the registered user and the personal identification number of the registered user is one example of the identification information of the registered biometric information used for discerning the registered biometric information from other registered biometric information.

In order to reduce the data amount for group feature and feature for matching, the registration unit 16 may code the group feature and feature for matching according to a given compression coding method and write the coded data into the storage unit 5 together with the user identification number. Still further, in order to increase the security against information leaks, the registration unit 16 may encrypt the user name, user identification number, personal identification number, group feature and feature for matching according to a given encryption method, and write the encrypted data into the storage unit 5.

Figure 5:
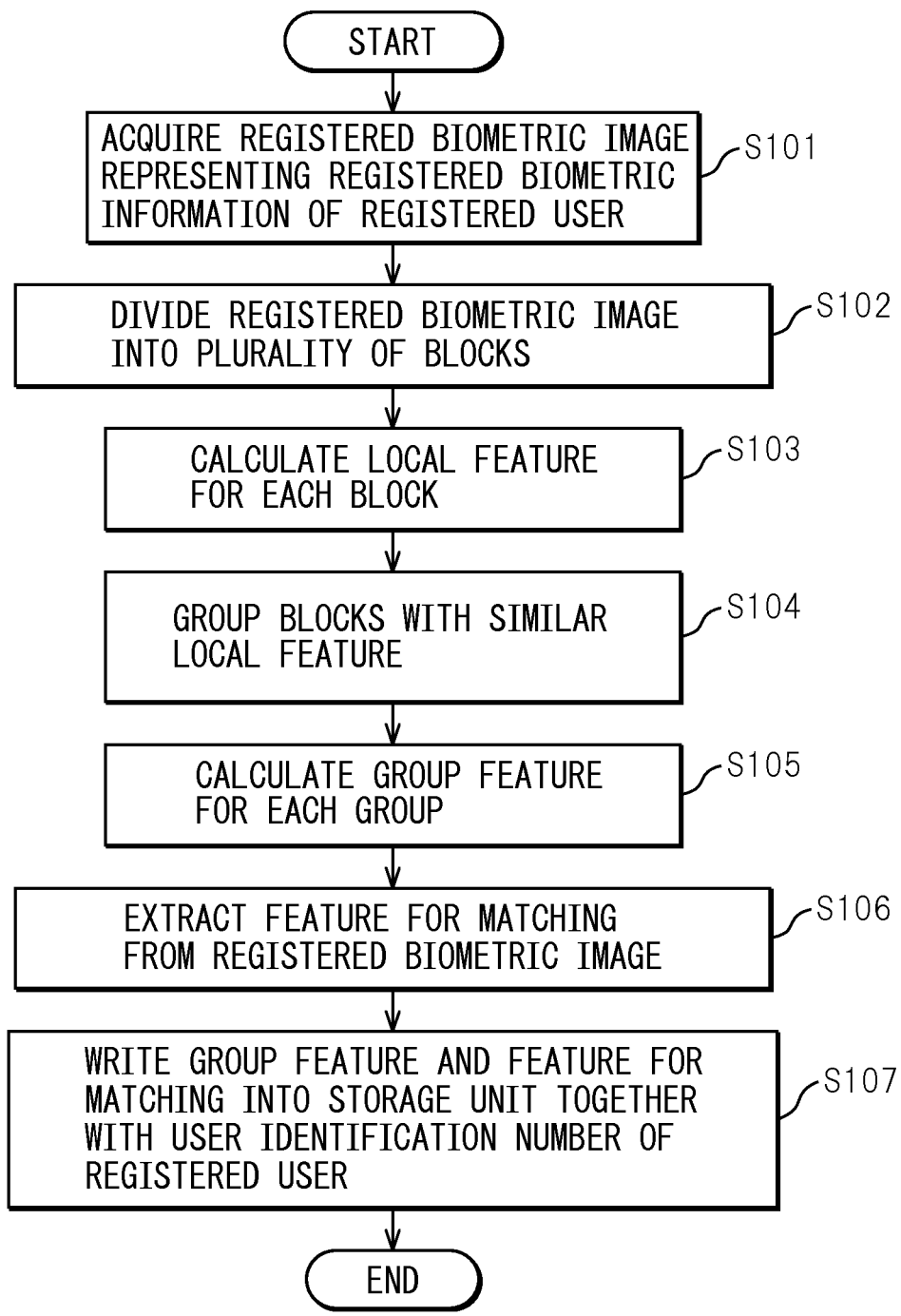
FIG. 5 is a diagram illustrating an operation flowchart of a biometric information registration process under the control of a computer program executed in a processing unit.

FIG. 5 is a drawing illustrating an operation flowchart of a biometric information registration process under the control of a computer program executed in the processing unit 6. As illustrated in FIG. 5, the processing unit 6 acquires a registered biometric image representing user's registered biometric information from the biometric information acquiring unit 3 (S101). The processing unit 6 passes the registered biometric image to the dividing unit 11, the local feature extracting unit 12, the group feature extracting unit 14 and the feature for matching extracting unit 15 in the processing unit 6.

The dividing unit 11 divides the registered biometric image into a plurality of blocks (Step S102). The dividing unit 11 notifies the local feature extracting unit 12 of block position information representing the position and the range of each block. The local feature extracting unit 12 calculates a local feature which is the geometric feature of biometric information for each block (Step S103). The local feature extracting unit 12 passes the local feature of each block to the grouping unit 13 together with the corresponding block position information.

The grouping unit 13 groups blocks with a similar local feature (S104). The grouping unit 13 passes the block position information and group identification number of each group to the group feature extracting unit 14.

The group feature extracting unit 14 calculates a group feature for each group (Step S105). The group feature extracting unit 14 passes the group feature obtained for each group to the registration unit 16 together with the group identification number.

The feature for matching extracting unit 15 extracts a feature for matching from the registered biometric image (Step S106). The feature for matching extracting unit 15 passes the extracted feature for matching to the registration unit 16.

The registration unit 16 writes the group feature and feature for matching of each group into the storage unit 5 together with the user name and user identification number of the registered user. Then the processing unit 6 terminates the biometric information registration process. The processing unit 6 may carry out the process in the step S106 prior to the process in the steps S102 to S105.

(Biometric Authentication Process)

Next, a biometric authentication process which judges whether or not a user is any one of the registered users by matching the biometric input information of the user with the registered biometric information will be described. In the present embodiment, the biometric authentication device 1 carries out a biometric authentication process according to a 1:N authentication procedure.

The dividing unit 11, the local feature extracting unit 12, the grouping unit 13 and the group feature extracting unit 14 carry out the same process as the biometric information registration process on the biometric input image representing the biometric input information of the user acquired from the biometric information acquiring unit 3 at the time of matching. The dividing unit 11, the local feature extracting unit 12, the grouping unit 13 and group feature extracting unit 14 sets a plurality of groups for the biometric input image and extracts a group feature for each group. The extracted group feature for each group is input to the selecting unit 17 together with the group identification number.

The feature for matching extracting unit 15 extracts a feature for matching from the biometric input information by performing the same process as the process to the above-mentioned registered biometric image on the biometric input image. The feature for matching extracting unit 15 passes the extracted feature for matching to the matching unit 18.

The selecting unit 17 obtains an evaluation value representing the degree of difference between the biometric input information and the registered biometric information for each of registered biometric information stored in the storage unit 5 each based on the group feature extracted from the biometric input information and the group feature extracted from the registered biometric information. The selecting unit 17 selects registered biometric information to which a matching process by the matching unit 18 is applied depending on the evaluation value. The selecting unit 17 reads the group feature associated with each registered biometric information and the user identification number of the user stored in the storage unit 5.

As mentioned above, the positional relationship at the time of matching between a finger of a user and the biometric information acquiring unit 3 sometimes differs from the positional relationship at the time of registration between the finger of the user and the biometric information acquiring unit 3. In particular, when a whole fingerprint is not contained in a biometric image such as when the biometric information acquiring unit 3 is a slide-type sensor, the range of the fingerprint contained in the registered biometric image sometimes differs from the range of the fingerprint contained in the biometric input image.

However, the minutiae density, which is one example of the group feature, is calculated for groups with a similar geometric feature of the biometric information. For this reason, when most part of the region corresponding to a specified group in each of two biometric images is contained in the biometric image, the minutiae densities for the specified group in the two biometric images are substantially the same value. Accordingly, even when the region of the biometric information contained in one of the two images partly differs from the region of the biometric information contained in the other, the minutiae densities of some groups are substantially the same value in the two biometric images.

Since each group is classified based on the geometric feature which is shift invariant and rotation invariant, the minutiae density calculated for each group is also a feature which is shift invariant and rotation invariant. Accordingly, the minutiae density does not depend on the position of the biometric information contained in the biometric image.

Figure 6A:
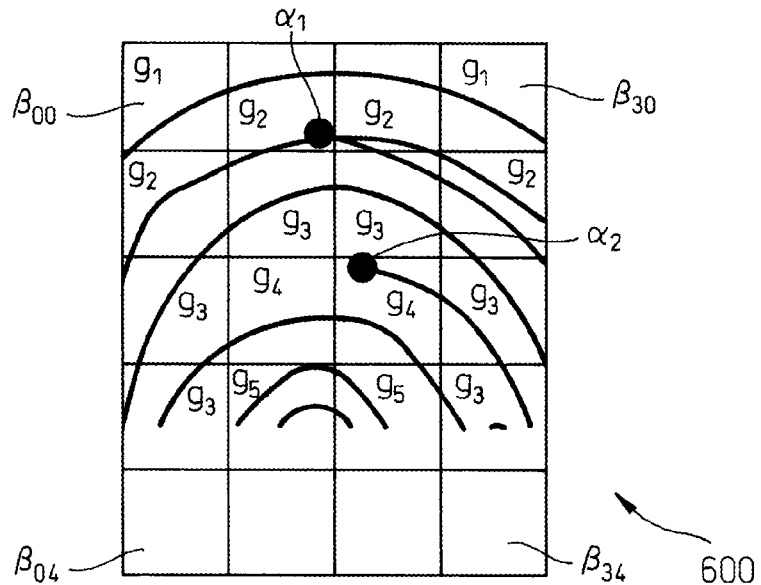
FIGS. 6A to 6C are individually examples of a biometric input image representing the same fingerprint as the fingerprint contained in the registered biometric image illustrated in FIG. 4.
Figure 6B:
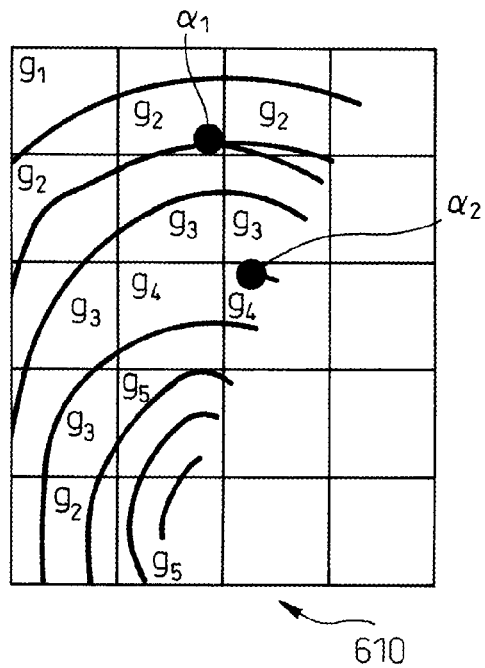
Figure 6C:
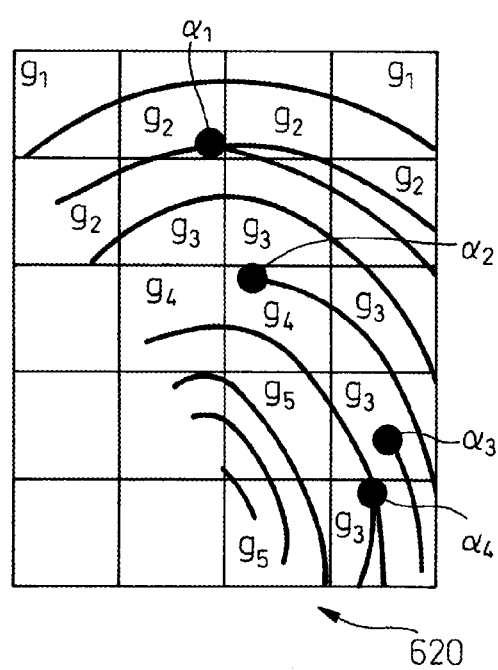

FIGS. 6A to 6C are individually examples of a biometric input image obtained by scanning the same fingerprint as the fingerprint contained in the registered biometric image illustrated in FIG. 4. In a biometric input image 600 illustrated in FIG. 6A, a lower part of the fingerprint is not contained in the biometric input image 600. In a biometric input image 610 illustrated in FIG. 6B, a part of the fingerprint to the right is not contained in the biometric input image 610. Further, in the biometric input image 620 illustrated in FIG. 6C, a part of the fingerprint to the left is not contained in the biometric input image 620.

The biometric input images 600 to 620 are divided into a plurality of blocks $B_{ij}$ (i=0 to 3, j=0 to 4), and each of the blocks are classified into groups $g_1$ to $g_5$ depending on the curvature of a ridge line in the block. In each of FIG. 4 and FIGS. 6A to 6C, points $\alpha_1$ to $\alpha_4$ are a minutia.

FIG. 7 represents a list 700 of minutiae density of each group obtained with respect to the registered biometric image 400 illustrated in FIG. 4 and the minutiae density of each group obtained with respect to the biometric input images 600 to 620 illustrated in FIGS. 6A to 6C.

In the table 700, the top row represents the minutiae density of each of the groups $g_1$ to $g_5$ obtained with respect to the registered biometric image 400. In the table 700, the second to the fourth rows individually represent the minutiae densities of each of the groups $g_1$ to $g_5$ obtained with respect to the biometric input images 600 to 620. In this example, the minutiae densities are classified into 'low' (the minutiae density in the group is 0/block), 'middle' (the minutiae density in the group is 0/block to lower than ⅓/block), 'high' (the minutiae density in the group is ⅓/block or higher).

As illustrated in the Table 700, even when a part of the fingerprint is not contained in the biometric input images 600 to 620, the minutiae densities of most groups in the biometric input images 600 to 620 are discovered to be the same as the minutiae density of a group corresponding to the registered biometric image 400.

The selecting unit 17 calculates the comparison value between the group feature extracted from the biometric input image and the group feature extracted from each of the registered biometric images for groups with a similar local feature and calculates the evaluation value by obtaining the sum of the comparison values.

When the difference between the area of a specified group in the biometric input image and the area of a group corresponding to a registered biometric image is small, the whole specified group is estimated to be contained in both biometric images. Therefore, the selecting unit 17 weights the comparison value of each group feature such that a group with a smaller difference between the area of the biometric input image and the area of the registered biometric image has a large weight with respect to the comparison value of the group feature obtained for the group. For example, the selecting unit 17 obtains an evaluation value according to the following equation:

$$E(S, T_j) = \sum_{i=1}^{M} \{c_i(f_i(S), f_i(T_j)) \times r_i\} = \qquad (2)$$

$$\sum_{i=1}^{M} \left\{|f_i(S) - f_i(T_j)| \times \frac{L - |A_i(S) - A_i(T_j)|}{(M-1)L + M}\right\}$$

$$L = \sum_{i=1}^{M} \{|A_i(S) - A_i(T_j)| + 1\},$$

where $E(S, T_j)$ is an evaluation value representing the degree of difference between biometric input information S and registered biometric information $T_j$ (j=1, 2, ..., N, where N is the total number of registered biometric information registered in the biometric authentication device 1). $f_i(S)$ and $f_i(T_j)$ are a group feature with respect to the biometric input information S and a group feature with respect to the registered biometric information $T_j$ in the group $g_i$ (i=1, 2, ..., M, where M is the total number of the groups), respectively. The $c_i(f_i(S), f_i(T_j))$ are comparison values between the group feature quantities $f_i(S)$ and $f_i(T_j)$ with respect to the groups $g_i$. In the present embodiment, $c_i(f_i(S), f_i(T_j))$ is represented by the absolute value of the difference between $f_i(S)$ and $f_i(T_j)$. Further, $r_i$(i=1, 2, ..., M) is a weighting factor for the comparison value $c_i(f_i(S), f_i(T_j))$ with respect to the group $g_i$. The weighting factor $r_i$ is a value normalized such that, for example, the smaller the absolute value of the difference between the number $A_i(S)$ of blocks contained in the group $g_i$ in the biometric input information S and the number $A_i(T_j)$ of blocks contained in the group $g_i$ in the registered biometric information $T_j$, the larger the factor; and the total sum of the $r_i$s is 1.

It is estimated that the larger the area of a specified group is, the more likely is the specified group to represent the feature of the whole biometric information. Therefore, the larger the sum of the area of the group in the biometric input image and the area of the corresponding group in the registered biometric image is, the larger the selecting unit 17 may make the weighting factor for the comparison value of the group feature obtained with respect to the group. In this case, the weighting factor $r_i$ for each group may be represented by the following equation:

$$r_i = \frac{A_i(S) + A_i(T_j)}{\sum_{i=1}^{M}(A_i(S) + A_i(T_j))}. \qquad (3)$$

In the present embodiment, the lower the evaluation value, the lower the degree of difference between the biometric input information and the registered biometric information. In other words, the lower the evaluation value is, the better the biometric input information matches the registered biometric information. Accordingly, the selecting unit 17 compares the evaluation value calculated for each of registered biometric information with a predetermined threshold. The selecting unit 17 selects registered biometric information corresponding to an evaluation value not higher than the given threshold as the one utilized for a matching process. The given threshold may be, for example, the average value of the evaluation values $E(S, T_j)$, or the value obtained by subtracting a given offset value from the average value.

Alternatively, the selecting unit 17 may select a prescribed number of registered biometric information in the ascending order of the evaluation value as the one utilized for the matching process. The prescribed number is set to a value which is smaller than the total number of the registered biometric images, for example, the maximum value of the number of the registered biometric images that the matching process can carry out in a waiting time in which the user does not feel stressed, and for example any of 5 to 100. The selecting unit 17 notifies the matching unit 18 of the user identification number of the registered user corresponding to the selected registered biometric information.

When the matching unit 18 receives the user identification number of the registered user selected from the selecting unit 17, the matching unit 18 reads a feature for matching of the registered biometric information corresponding to the user identification number of the selected registered user. The matching unit 18 then matches the biometric input information with the selected registered biometric information by using the feature for matching extracted from the biometric input information received from the feature for matching extracting unit 15 and the feature for matching of the selected registered biometric information. The matching unit 18 then obtains, as the result of the matching process, the degree of similarity representing the degree of similarity of the biometric input information to the registered biometric information.

The matching unit 18 can use, for example, a minutiae matching, or a pattern matching as the matching process.

When matching the biometric input information with the registered biometric information by a minutiae matching, the matching unit 18 selects, as a first reference minutia, the minutia located at or near the center of the region representing the registered biometric information in the registered biometric image. Further, the matching unit 18 selects one of the minutiae extracted from the biometric input image as a second reference minutia. Then, the matching unit 18 shifts the biometric input image such that the second reference minutia matches the first reference minutia. The matching unit 18 may select singular points such as a vortex core as the first and second reference minutiae. After that, while rotating the biometric input image, the matching unit 18 obtains the number of minutiae on the biometric input image that match the minutiae on the registered biometric image. By repeating the above process while changing the combination of the first reference minutia and the second reference minutia, the matching unit 18 obtains the maximum number of minutiae on the biometric input image that match the minutiae on the registered biometric image.

Finally, the matching unit 18 obtains the degree of similarity by dividing that maximum number by the total number of minutiae extracted from the biometric input information. In this case, the degree of similarity takes any value between 0 and 1, and the higher the degree of similarity between the biometric input information and the registered biometric information, the closer to 1 the value of the degree of similarity.

To detect the minutiae of the biometric input information that match the minutiae of the registered biometric information, the matching unit 18 examines whether there is any minutia of the registered biometric information within a predetermined range centered at the position of a focused minutia of the biometric input information. The predetermined range may be set to a value equivalent, for example, to the average space between two adjacent ridges. When there is any minutia of the registered biometric information within the predetermined range centered at the position of the focused minutia, the matching unit 18 obtains the angle difference between the ridge directions near the respective minutiae. When the absolute angle difference between the ridge directions falls within a predetermined angle range, the matching unit 18 judges that the minutia of the registered biometric information matches the focused minutia of the biometric input information. The predetermined angle range here is chosen to have a value corresponding to an allowable range within which the ridge direction near the attention minutia can be considered to match the ridge direction near the corresponding minutia of the registered biometric information, and may be set, for example, to 10 degrees. The matching unit 18 may determine that the minutia of the registered biometric information that matches the focused minutia of the biometric input information exists, only when the minutia of the registered biometric information located within the predetermined range centered at the position of the focused minutia is of the same kind as the focused minutia. The matching unit 18 may use other known methods to obtain the number of minutiae of the registered biometric information that match the minutiae of the biometric input information.

On the other hand, when performing the matching between the biometric input information and the selected registered biometric information by pattern matching, the matching unit 18 uses the biometric input image and the registered biometric image stored in the storage unit 5 as the feature for matching concerning the registered biometric information. Then, while variously changing the position of the biometric input image relative to the registered biometric image, the matching unit 18 computes the correlation $c(i, j)$ between the biometric input image and the registered biometric image by using the following equation.

$$c(i, j) = \frac{\sum_x \sum_y \{(I(x, y) - I_{av})(T(x-i, y-j) - T_{av})\}}{\sqrt{\sum_x \sum_y (I(x, y) - I_{av})^2 \sum_x \sum_y (T(x-i, y-j) - T_{av})^2}}, \quad (4)$$

where $I(x, y)$ represents the pixel value of a pixel contained in the biometric input image and located at a position designated by a horizontal coordinate x and a vertical coordinate y. Further, $T(x-i, y-j)$ represents the pixel value of a pixel contained in the registered biometric image and located at a position designated by a horizontal coordinate (x-i) and a vertical coordinate (y-j). On the other hand, $I_{av}$ is the average pixel value of the pixels contained in the biometric input image, while $T_{av}$ is the average pixel value of the pixels contained in the registered biometric image. Here, i and j indicate the amount of displacement between the biometric input image and the registered biometric image in the horizontal direction and the vertical direction, respectively. Further, $c(i, j)$ represents the correlation value when the biometric input image is displaced relative to the registered biometric image by i pixels in the horizontal direction and j pixels in the vertical direction. The correlation value $c(i, j)$ can take any value between −1 and 1. The correlation value $c(i, j)$ is 1 when the biometric input image perfectly matches the registered biometric image. On the other hand, when the biometric input image is completely reversed with respect to the registered biometric image, the correlation value $c(i, j)$ is −1.

The matching unit 18 sets the maximum value of the correlation values $c(i, j)$ obtained for the focused registered biometric information to the degree of similarity between the focused registered biometric information and the biometric input information.

The matching unit 18 obtains the maximum value of the degrees of similarity calculated for each of the selected registered biometric information. The matching unit 18 passes the maximum value of the degrees of similarity and the user identification number of the registered user of the registered biometric information corresponding to the maximum value to the authentication judging unit 19.

When the maximum value of the degrees of similarity is not smaller than an authentication judging threshold value, the authentication judging unit 19 judges that the biometric input information matches the registered biometric information corresponding to the maximum value of the degrees of similarity. Then, the authentication judging unit 19 authenticates the user as being the registered user having the registered biometric information corresponding to the maximum value of the degrees of similarity. When the user is authenticated, the authentication judging unit 19 notifies the processing unit 6 of the result of the authentication. Then, the processing unit 6 permits the authenticated user to use the device equipped with the biometric authentication device 1 or the device connected to the biometric authentication device 1.

On the other hand, when the degree of similarity is smaller than the authentication judging threshold value, the authentication judging unit 19 judges that the biometric input information does not match the registered biometric information. In this case, the authentication judging unit 19 does not authenticate the user. The authentication judging unit 19 notifies the processing unit 6 of the result of the authentication indicating the failure to authenticate the user. The processing unit 6 denies the unauthenticated user an access to the device equipped with the biometric authentication device 1 or the device connected to the biometric authentication device 1. Further, the processing unit 6 causes the display unit 2 to display a message indicating that the authentication has failed. It is preferable to set the authentication judging threshold value to such a value that the authentication judging unit 19 succeeds to authenticate the user only when the user is a legitimate registered user. It is also preferable to set the authentication judging threshold value to such a value that the authentication judging unit 19 fails to authenticate the user when the user is a person other than a legitimate registered user. For example, the authentication judging threshold value may be determined by multiplying the difference between the maximum and minimum values that the degree of similarity can take by 0.7 and adding the resulting product to the minimum value of the degree of similarity.

Figure 8:
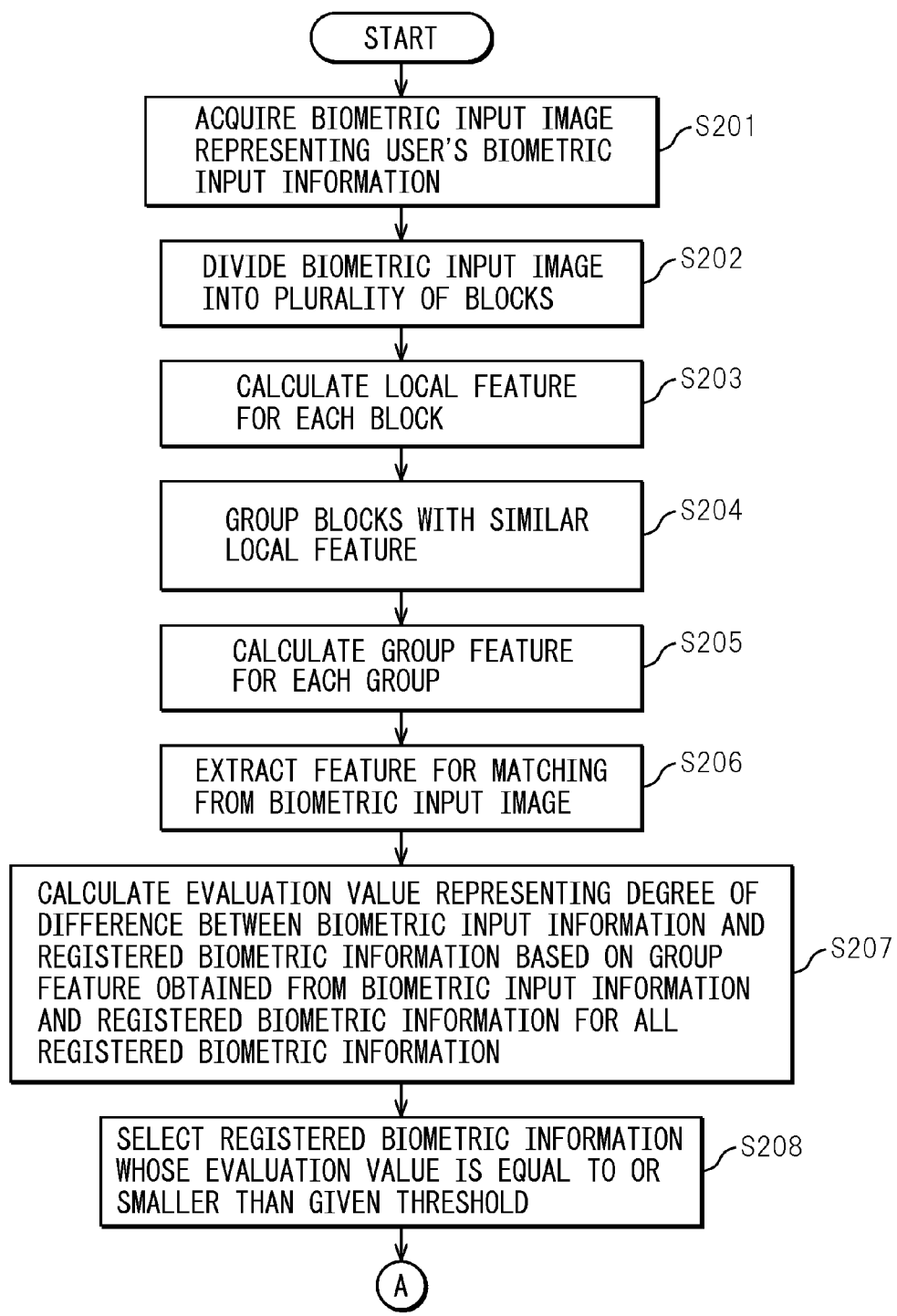
FIG. 8 is a drawing illustrating an operation flowchart of a biometric authentication process under the control of a computer program executed in a processing unit.
Figure 9:
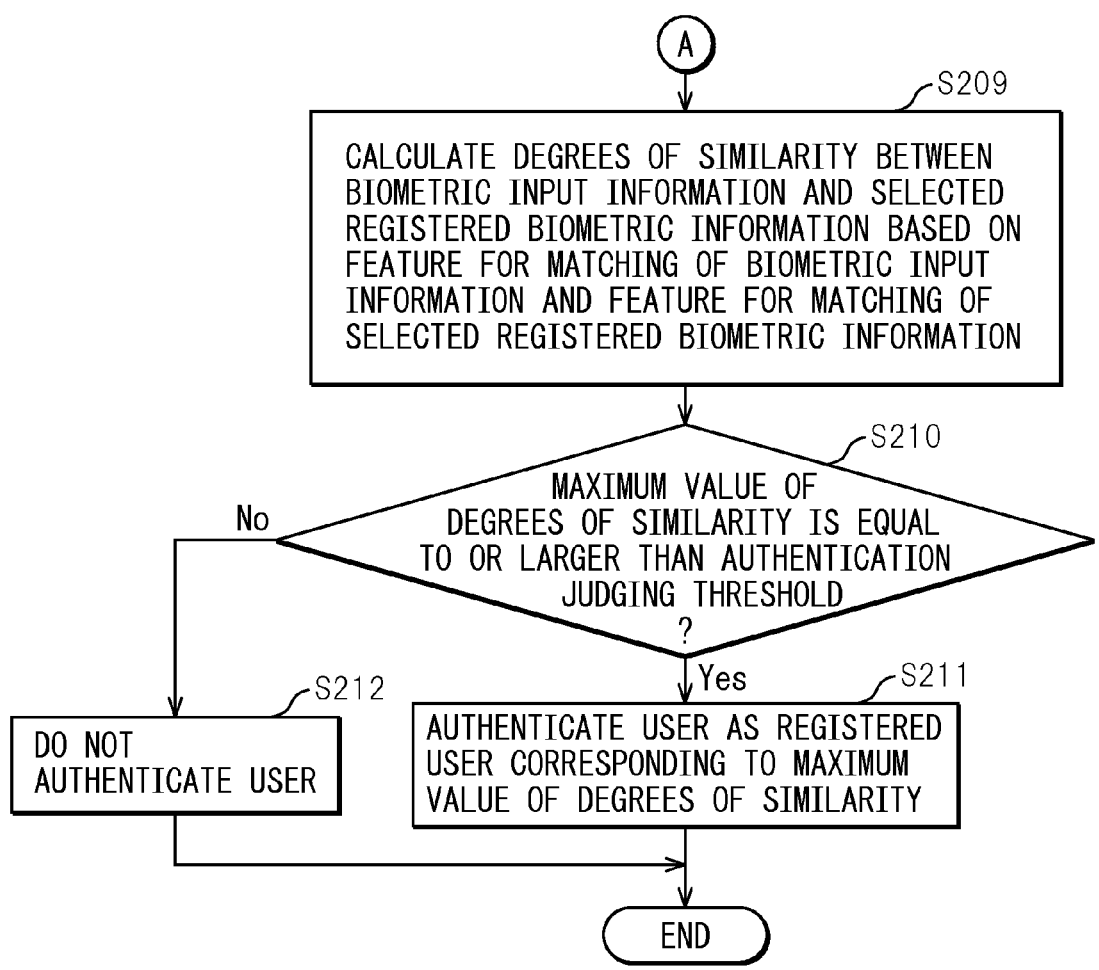
FIG. 9 is a drawing illustrating an operation flowchart of a biometric authentication process under the control of a computer program executed in a processing unit.

FIGS. 8 and 9 are an operation flowchart of the biometric authentication process which is performed under the control of a computer program executed on the processing unit 6.

As illustrated in FIG. 8, the processing unit 6 acquires a biometric input image representing the user's biometric input information from the biometric information acquiring unit 3 (step S201). The processing unit 6 passes the biometric input image to the dividing unit 11, the local feature extracting unit 12, the group feature extracting unit 14 and the feature for matching extracting unit 15 of the processing unit 6.

The dividing unit 11 divides the biometric input image into a plurality of blocks (step S202). The dividing unit 11 notifies the local feature extracting unit 12 of block position information representing the position and the range of each block. The local feature extracting unit 12 calculates a local feature which is the geometric feature of the biometric information for each block (step S203). The local feature extracting unit 12 passes the local feature of each block to the grouping unit 13 together with the corresponding block position information.

The grouping unit 13 groups blocks with a similar local feature (step S204). The grouping unit 13 passes, for each group, the position information of each block contained in the group and the group identification number to the group feature extracting unit 14.

The group feature extracting unit 14 calculates the group feature for each group (step S205). The group feature extracting unit 14 passes the group feature obtained for each group to the selecting unit 17 together with the group identification number.

The feature for matching extracting unit 15 extracts a feature for matching from the biometric input image (step S206). The feature for matching extracting unit 15 passes the extracted feature for matching to the matching unit 18.

The selecting unit 17 calculates, for all of the registered biometric information, the evaluation value representing the degree of difference between the biometric input information and the registered biometric information based on the group feature obtained from the biometric input information and the group feature obtained from the registered biometric information (step 207). The selecting unit 17 selects registered biometric information in which the evaluation value is equal to or less than a predetermined threshold (step S208). Then the selection unit 17 reports a user identification number associated with the selected user identification number.

As illustrated in FIG. 9, the matching unit 18 reads the feature for matching of the registered biometric information corresponding to the user identification number received from the selecting unit 17. The matching unit 18 calculates the degrees of similarity between the biometric input information and the selected registered biometric information based on the feature for matching of the biometric input information and the feature for matching of the selected registered biometric information. Then, the matching unit 18 obtains the maximum value of the degrees of similarity and passes the user identification number of the registered user corresponding to the maximum value to the authentication judging unit 19 of the processing unit 6.

The authentication judging unit 19 judges whether or not the maximum value of the degrees of similarity is equal to or larger than the authentication judging threshold (step S210).

When the maximum value of the degrees of similarity is equal to or more than the authentication judging threshold (step S201—Yes), the authentication judging unit 19 authenticates the user as a registered user associated with the user identification number corresponding to the maximum value of the degrees of similarity (step S211).

On the other hand, when the maximum value of the degrees of similarity is smaller than the authentication judging threshold (step S210—No), the authentication judging unit 19 does not authenticate the user (step S212).

After step S211 or S212, the processing unit 6 terminates the biometric authentication process. The processing unit 6 may carry out the process of step S206 prior to the processes of steps S202 to S205.

As has been described above, the biometric authentication device according the embodiment groups blocks with a similar geometric feature of the biometric information, and selects registered biometric information for matching the biometric input information based on the group feature extracted from each group. Since the group feature is a feature which is rotation invariant and shift invariant, the group feature hardly depends on the position of the biometric information on a biometric image. The group feature does not depend on the size of the group. When some groups are contained in both of the registered biometric image and the biometric input image which are generated for certain registered user, the group feature quantities for some groups are substantially the same value in the biometric input image and the registered biometric image. For this reason, even when a part of the group is not contained in the biometric input image, the degree of difference obtained based on the group feature for the biometric input image and the registered biometric image becomes low. For this reason, the biometric authentication device can appropriately select a registered biometric image which is the object of matching process from a plurality of registered biometric images even when the biometric input image only contains a part of user's biometric information. As is obvious from the equation (2), the computational complexity for calculating the evaluation value using a group feature is considerably smaller than the computational complexity of the matching process by a matching unit. Accordingly, the biometric authentication device can reduce the computational complexity of a biometric authentication process in a 1:N authentication procedure.

Next, biometric authentication device according to a second embodiment will be described. The biometric authentication device according to the second embodiment carries out a biometric authentication process according to a 1:1 authentication procedure. The biometric authentication device carries out a simple matching process having smaller computational complexity than the computational complexity of a matching process by a matching unit using a group feature prior to the matching process. The biometric authentication device carries out the matching process only when there is a possibility that the user is a registered user as the result of the simple matching process.

The biometric authentication device according to the second embodiment differs from the biometric authentication device according to the first embodiment in a part of the function relating to the biometric authentication process of a processing unit. Accordingly, the difference between the function of the processing unit of the biometric authentication device according to the second embodiment and the function of the processing unit of the biometric authentication device according to the first embodiment will be described. Since the biometric information registration process performed by the biometric authentication device according to the second embodiment is same as the biometric information registration process performed by the biometric authentication device according to the first embodiment, only the biometric authentication process will be described. See the explanation of the above-mentioned biometric information registration process for the biometric information registration process.

Figure 10:
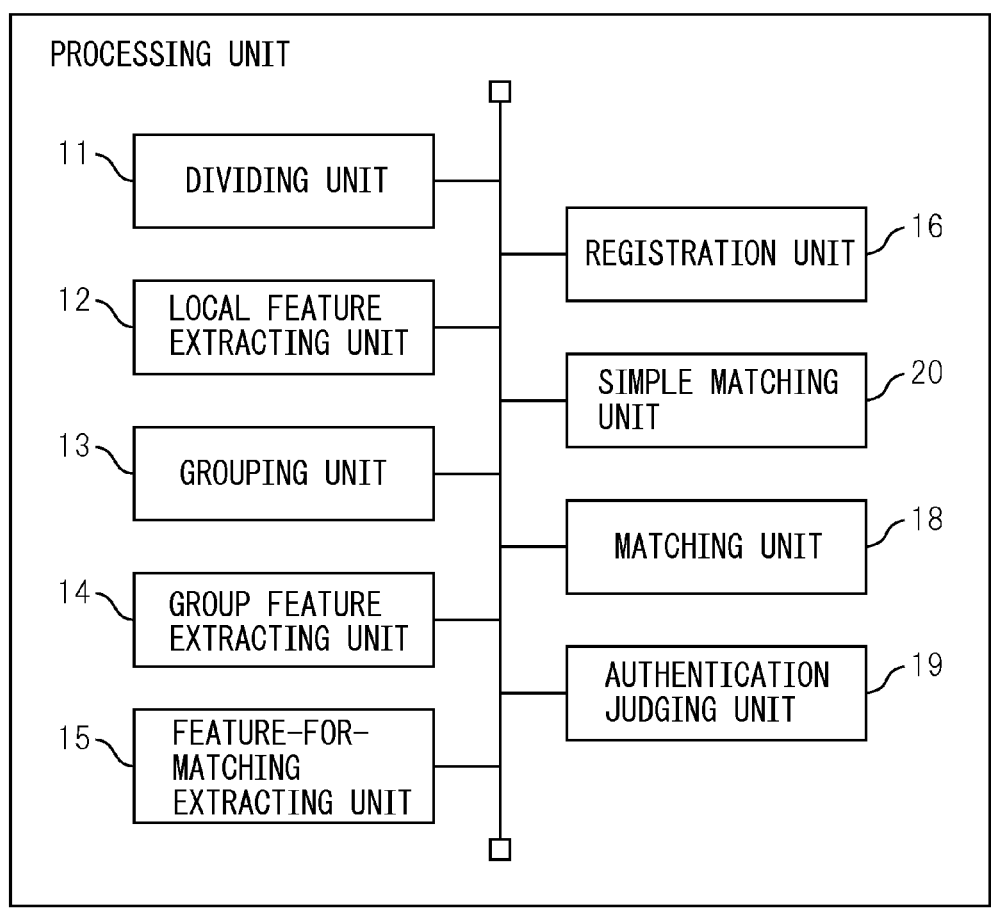
FIG. 10 is a functional block diagram of a processing unit which a biometric authentication device according to a second embodiment includes.

FIG. 10 is a functional block diagram of a processing unit included in the biometric authentication device according to the second embodiment. As illustrated in FIG. 10, the processing unit 7 differs from the processing unit 6 illustrated in FIG. 2 in that the processing unit 7 includes a simple matching unit 20 in place of a selection unit 17. In FIG. 10, the functional blocks of the processing unit 7 corresponding to those of the processing unit 6 illustrated in FIG. 2 are respectively designated by the same reference numerals.

At the time of matching, a specified finger of a user is scanned by the biometric information acquiring unit 3 and the biometric information acquiring unit 3 generates a biometric input image. The biometric information acquiring unit 3 then outputs a biometric input image to the processing unit 7. The user operates the input unit 4 to input the user name which is one example of information which identifies the user. Alternatively, the user may operate the input unit 4 to input a personal identification number together with the user name.

The input unit 4 outputs the user name or the personal identification number together with the user name to the processing unit 7.

The processing unit 7 passes the biometric input image to the dividing unit 11, the local feature extracting unit 12 and the group feature extracting unit 14, and extracts the group feature of each group of the biometric input information contained in the biometric input image.

The processing unit 7 reads in from the storage unit 5 the group feature and feature for matching for the registered biometric information corresponding to the user name received from the input unit 4. When the processing unit 7 receives a personal identification number together with the user name from the input unit 4, the processing unit 7 judges whether or not the personal identification number stored together with the user name matches the input personal identification number. The processing unit 7 may read from the storage unit 5 the group feature and feature for matching corresponding to the user name only when the two personal identification numbers match.

The processing unit 7 passes the group feature extracted from the biometric input information and the group feature of the registered biometric information corresponding to the input user name to the simple matching unit 20.

The simple matching unit 20 calculates an evaluation value representing the degree of difference between the biometric input information and the registered biometric information based on the group feature extracted from the registered biometric information according to the above-mentioned equation (2) or equation (3).

When the evaluation value thereof is higher than a given threshold, i.e., the degree of the difference is high, the simple matching unit 20 judges that the user is not a registered user corresponding to the input user name. On the other hand, when the evaluation value is not higher than a given threshold, the simple matching unit 20 judges that there is a possibility that the user is a registered user corresponding to the input user name.

The given threshold may be, for example, the minimum value of the evaluation value in which the false rejection rate is substantially 0%.

The simple matching unit 20 then notifies the processing unit 7 of the judgment.

When the processing unit 7 receives the judgment that the user is not a registered user corresponding to the input user name by the simple matching unit 20, the processing unit 7 terminates the biometric authentication process. On the other hand, when the processing unit 7 receives the judgment that there is a possibility that the user is a registered user corresponding to the input user name by the simple matching unit 20, the processing unit 7 passes the biometric input image to the feature for matching extracting unit 15. The feature for matching extracting unit 15 then extracts the feature for matching of the biometric input information. The processing unit 7 reads from the storage unit 5 the feature for matching of the registered biometric information corresponding to the input user name. Then the processing unit 7 passes the feature for matching of the biometric input information and the feature for matching of the registered biometric information corresponding to the input user name to the matching unit 18.

The matching unit 18 matches the biometric input information with the registered biometric information based on the feature for matching. The matching unit 18 obtains the degree of similarity representing the degree of similarity of the biometric input information to the registered biometric information as the result of the matching process. The matching unit 18 passes the degree of similarity to the authentication judging unit 19.

When the degree of similarity is not lower than the authentication judging threshold, the authentication judging unit 19 authenticates the user as a registered user corresponding to the input user name. On the other hand, the degree of similarity is smaller than the authentication judging threshold, the authentication judging unit 19 does not authenticate the user.

Figure 11:
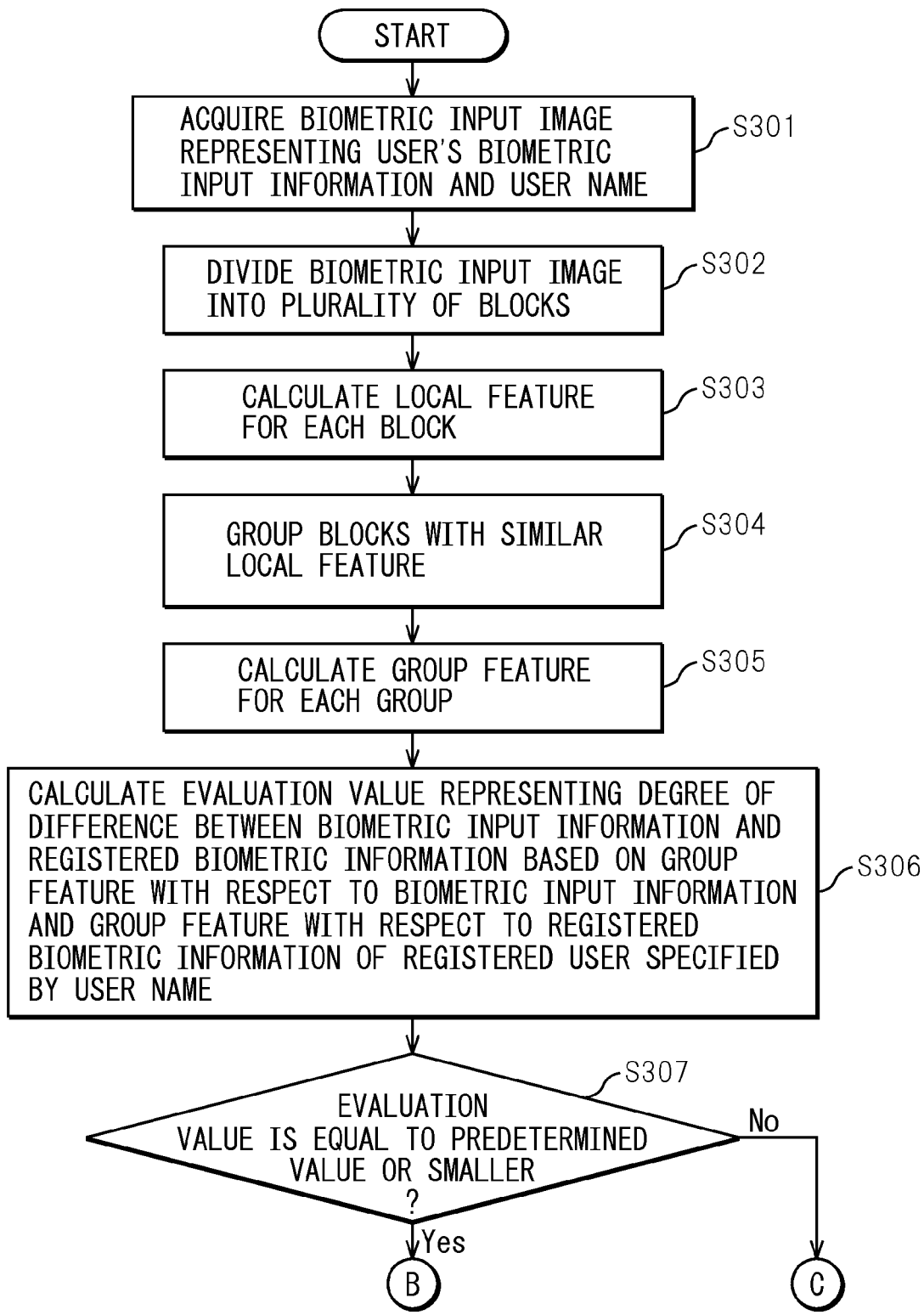
FIG. 11 is a drawing illustrating an operation flowchart of a biometric authentication process under the control of a computer program executed in a processing unit according to the second embodiment includes.
Figure 12:
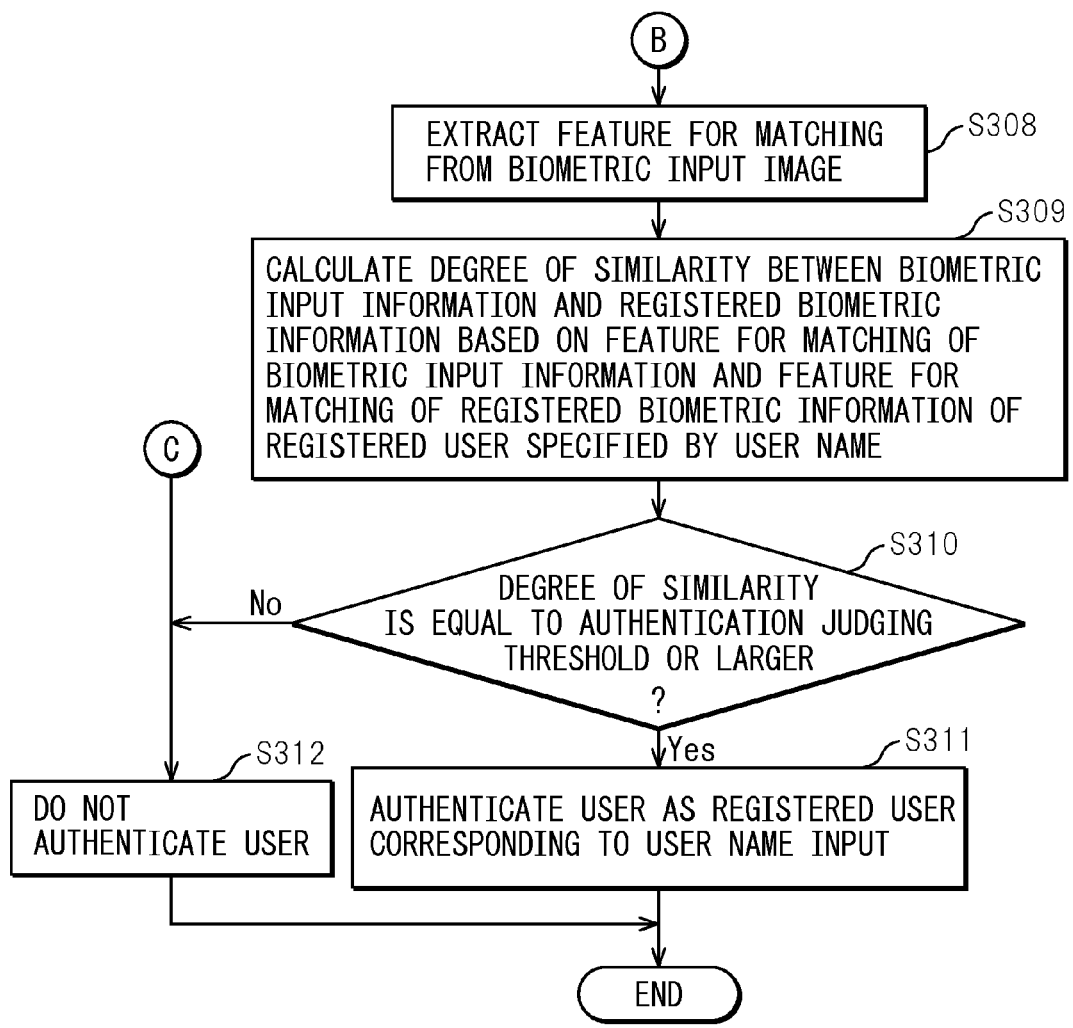
FIG. 12 is a drawing illustrating an operation flowchart of a biometric authentication process under the control of a computer program executed in a processing unit according to the second embodiment.

FIG. 11 and FIG. 12 illustrate an operation flowchart of a biometric authentication process according to the second embodiment under the control of a computer program executed on the processing unit 7.

The processing unit 7 acquires a biometric input image representing user's biometric input information from the biometric information acquiring unit 3. The processing unit 7 acquires the user name from the input unit 4 (step S301). The processing unit 7 passes the biometric input image to the dividing unit 11, local feature extracting unit 12 and group feature extracting unit 14 of the processing unit 7.

The dividing unit 11 divides the biometric input image into a plurality of blocks (step S302). The dividing unit 11 notifies the local feature extracting unit 12 of the block position information representing the position and the range of each block. The local feature extracting unit 12 calculates the local feature which is the geometric feature of the biometric information of each block (step S303). The local feature extracting unit 12 passes the local feature of each block to the grouping unit 13 together with corresponding block position information.

The grouping unit 13 groups blocks with a similar local feature (step S304). The grouping unit 13 passes, for each group, the block position information of each block contained in the group and the group identification number to the group feature extracting unit 14.

The group feature extracting unit 14 calculates the group feature for each group (step S305). The group feature extracting unit 14 passes the group feature obtained for each group to the simple matching unit 20. The processing unit 7 reads from the storage unit 5 the group feature extracted from the registered biometric information of a registered user specified by the user name, and passes the group feature to the simple matching unit 20.

The simple matching unit 20 calculates an evaluation value representing the degree of difference between the biometric input information and the registered biometric information based on the group feature for the biometric input information and the group feature for the registered biometric information of a registered user specified by the user name (step S306). The simple matching unit 20 judges whether or not the evaluation value is not higher than a given threshold (step S307). The simple matching unit 20 notifies processing unit 7 of the judgment.

When the evaluation value is larger than the given threshold (step S307—No), the processing unit 7 judges that the user is not a registered user specified by the user name, and does not authenticate the user (step S312). The processing unit 7 then terminates the biometric authentication process.

On the other hand, as illustrated in FIG. 12, when the evaluation value is not higher than the given threshold (step S307—Yes), the processing unit 7 passes the biometric input image to the feature for matching extracting unit 15. The feature for matching extracting unit 15 extracts the feature for matching from the biometric input image (step S308). On the other hand, the processing unit 7 reads from the storage unit 5 the feature for matching of the registered biometric information corresponding to the input user name. The processing unit 7 passes the feature for matching with respect to the biometric input information and the feature for matching with respect to the registered biometric information corresponding to the input user name to the matching unit 18.

The matching unit 18 calculates the degree of similarity between the biometric input information and the registered biometric information based on the feature for matching of the biometric input information and the feature for matching of the registered user specified by the user name. The matching unit 18 passes the degree of similarity to the authentication judging unit 19 of the processing unit 7.

The authentication judging unit 19 judges whether or not the degree of similarity is not smaller than the authentication judging threshold value (step S310).

When the degree of similarity is not smaller than the authentication judging threshold value (step S310—Yes), the authentication judging unit 19 authenticates the user as the registered user specified by the user name input by the user (step S311).

On the other hand, when the degree of similarity is smaller than the authentication judging threshold value (step S310—No), the authentication judging unit 19 does not authenticate the user (step S312).

After step S311 or S312, the processing unit 7 terminates the biometric authentication process.

As has been described above, the biometric authentication device according to the second embodiment carries out, in the 1:1 authentication procedure, a simple matching process by using the group feature extracted from the biometric input information and the group feature extracted from the registered biometric information specified by the user name. The biometric authentication device carries out an accurate matching process as long as the biometric input information matches the registered biometric information to some extent as the result of the simple matching process. For this reason, the biometric authentication device can reduce the computational complexity of the biometric authentication process, in particular, when the user is different from the registered user specified by the user name.

The present invention is not limited to the above specific embodiments. For example, when the group feature and feature for matching of the registered biometric information is obtained by other device in advance, the processing unit of the biometric authentication device according to the above-mentioned embodiment may not include a function of the registration unit. According to another embodiment, a biometric information registration device not having a function of carrying out a biometric authentication process and having only a function of carrying out a biometric information registration process may be provided. In this case, the biometric information registration device includes, for example, the same units as units included in the biometric authentication device according to the first embodiment. It is noted that the processing unit of the biometric information registration device has functions of a dividing unit, a local feature extracting unit, a grouping unit, a group feature extracting unit, a feature for matching extracting unit and a registration unit; and the device may not include functions of a selecting unit, a matching unit and an authentication judging unit.

According to still another embodiment, the local feature extracting unit may extract a plurality of geometric feature quantities with respect to the biometric information for each block. The grouping unit may carry out grouping by blocks with any of a plurality of geometric feature quantities being similar. In this case, examples of the plurality of geometric feature quantities may include the curvature of the ridge line and the width of the ridge line. The grouping unit classifies the blocks into subgroups $g_1$ to $g_m$ (where m is an integer of 2 or larger) by comparing the curvature of the ridge line with one or more thresholds with respect to the curvature of the ridge line as illustrated in Table 1 for each block. In the same manner, the grouping unit classifies the blocks into subgroups $h_1$ to $h_n$ (where n is an integer of 2 or larger) by comparing the ridge line width with one or more thresholds with respect to the ridge line width for each block. The grouping unit sees blocks in which classified subgroups $g_i$ and $h_j$ are the same for individual blocks as in the same group.

Further, the group feature extracting unit may extract a plurality of group feature quantities for each group. For example, the plurality of group feature quantities may include the minutiae density and the density of sweat glands present in the group.

In this case, in the selecting unit and the simple matching unit, the absolute value of the difference with respect to each group feature is obtained for each group, and the sum of the absolute values of the differences is calculated as an evaluation value representing the degree of difference between the biometric input information and the registered biometric information.

The selecting unit and simple matching unit may calculate an evaluation value which becomes the larger, as the degree of matching of the biometric input information and the registered biometric information becomes higher. In this case, the selecting unit and simple matching unit may use $1/\{|f_i(S)-f_i(T_j)|+1\}$ as the comparison value $c_i(f_i(S), f_i(T_j))$ in equation (2).

Further, in the biometric information registration process, the biometric authentication device may obtain the local feature, the group feature and the feature for matching by using a plurality of registered biometric images created by reading the biometric information of a specified registered user by the biometric information acquiring unit a plurality of times.

In this case, for example, the local feature extracting unit detects a singular point such as a vortex core for each registered biometric image. The local feature extracting unit can detect a singular point, for example, by using a template matching as explained with respect to the group feature extracting unit. The local feature extracting unit adjusts the position of each registered biometric image such that a singular point matches with each other.

The local feature extracting unit obtains the average value of the local feature extracted from each registered biometric image for each block, and the average value is set as the local feature of the block. Alternatively, the local feature extracting unit may set, for each block, the mode value or the median value of the local feature extracted from each registered biometric image to the local feature of the block.

In the same manner, the group feature extracting unit may set, for each group, the average, the mode value or the median value of the group feature extracted from each registered biometric image to the group feature of the group. Further, the feature for matching extracting unit divides each of the registered biometric images, each of whose positions is adjusted, into a micro region in such a manner that the image contains about one minutia, and extracts a minutia for each micro region. The feature for matching extracting unit may judge that a micro region includes a minutia when the micro regions include a minutia on half or more of the registered biometric images.

The biometric authentication device according to still another embodiment uses a palm print in place of a fingerprint as biometric information utilized for biometric authentication. Also in this case, the biometric authentication device can carry out a biometric information registration process which the biometric authentication device according to the abovementioned embodiment and modified examples thereof performs, a biometric information registration process same as the biometric authentication process and a biometric authentication process to the biometric input image and the registered biometric image.

Further, a biometric authentication device according to another embodiment, as the biometric information utilized for the biometric authentication, the palm of a hand, a vein pattern of a back of a hand or a finger may be used. In this case, the biometric authentication device calculates the number of veins contained in a block or the ratio of pixels representing a vein to the whole block for each of a plurality of blocks that the biometric image is divided into is calculated for the local feature. In this case, in order to extract a local feature, for example, the local feature extracting unit binarizes a biometric image containing a vein pattern into pixels representing a vein and pixels not representing a vein. The local feature extracting unit can calculate the ratio of the pixels representing a vein to the whole block by counting the pixels corresponding to the vein for each block. Alternatively, the local feature extracting unit obtains a group of pixels representing a vein which is connecting by performing a labeling process for each block. The local feature extracting unit can set the number of groups to the number of veins contained in the block.

The biometric authentication device calculates, for example, the number of the endings and the bifurcations of the vein per unit area as a group feature. The group feature extracting unit can detect the ending and the bifurcation of the vein by matching a biometric image containing a vein pattern with a binarized image which is binarized into a pixel representing a vein and a pixel not representing a vein and with a template representing a pattern of the ending or bifurcation of the vein.

The biometric authentication device and the biometric authentication method disclosed in this specification are applicable to various kinds of devices or systems that perform biometric authentication between user biometric information and preregistered biometric information in order to permit the user to perform a desired operation. Such devices or systems include, for example, a computer system in which one or more terminals are connected to a server via a communication network. In this case, each terminal is equipped with the biometric information acquiring unit, and the biometric image acquired by the biometric information acquiring unit is transmitted to the server. Then, the server carries out the biometric image registration or biometric authentication process by implementing the functions of the processing unit according to any one of the above embodiments.

Further, a processor of each terminal may include, among the functions of the processing units according to the abovementioned embodiments, a function of dividing unit, local feature extracting unit, grouping unit, group feature extracting unit and feature for matching extracting unit. This serves to alleviate the processing load on the server processor.

Further, a processing unit of a portable memory device, into which the biometric information acquiring unit, storage unit, processing unit, and a data transfer interface conforming to a standard such as Universal Serial Bus are integrated, may be configured to implement the various functions of the processing unit of the computer according to each of the above embodiments.

Further, the computer program that executes instructions for causing the computer to implement the functions of the processing unit according to each of the above embodiments may be provided in the form of a recording medium.

All examples and conditional language recited herein are intended for pedagogical purposes to aid the reader in understanding the invention and the concepts contributed by the inventor to furthering the art and are to be construed as being without limitation to such specifically recited examples and conditions, nor does the organization of such examples in the specification relate to a showing of the superiority and inferiority of the invention.

Although the embodiments of the present inventions have been described in detail, it should be understood that the various changes, substitutions, and alterations could be made hereto without departing from the spirit and scope of the invention.

What is claimed is:

1. A biometric authentication device comprising:
   a biometric information acquiring unit which acquires biometric input information of a user and generates a biometric input image representing the biometric input information;
   a storage unit which stores, for each of first prescribed number of registered users which have been preregistered, and stores, for each of a plurality of groups, a first group feature representing a feature of registered biometric information contained in the group, the plurality of groups being obtained by dividing a registered biometric image representing the registered biometric information of a registered user into a plurality of blocks, and classifying the plurality of blocks so that blocks which contain geometric features of the registered biometric information which are similar to each other, are classified into a same group; and
   a processing unit configured to perform a process including:
   dividing the biometric input image into a plurality of blocks;
   extracting, for each of the plurality of blocks in the biometric input image, a local feature representing a geometric feature of the biometric input information contained in the block;
   classifying the plurality of blocks in the biometric input image into the plurality of groups by blocks with the similar local feature;
   extracting, for each of the plurality of groups in the biometric input image, a second group feature representing the feature of the biometric input information contained in the group;
   calculating, from the plurality of groups set for the biometric input image and the plurality of groups set for each of a plurality of the registered biometric images, the difference between the second group feature and the first group feature for each group with the similar local feature, and calculating, depending on the difference, the degree of difference between each of the plurality of registered biometric information and the biometric input information, and selecting a second prescribed number, which is smaller than the first prescribed number, of registered biometric information in the ascending order of the degree of the difference; and
   matching the selected registered biometric information with the biometric input information.

2. The biometric authentication device according to claim 1, wherein the local feature is a feature which is invariable with respect to the position and rotation of the biometric input information on the biometric input image.

3. The biometric authentication device according to claim 2, wherein the biometric information is a fingerprint, and the local feature is a curvature of a ridge line or a valley line of the fingerprint contained in each of the plurality of blocks.

4. The biometric authentication device according to claim 2, wherein the biometric information is a vein pattern, and the local feature is the number of veins contained in each of the plurality of blocks or the ratio of pixels representing a vein to each of the plurality of blocks.

5. The biometric authentication device according to claim 1, wherein the first group feature and the second group feature are the number of feature points of biometric information contained in each of the plurality of groups per unit area.

6. The biometric authentication device according to claim 5, wherein the biometric information is a fingerprint and the feature point is a bifurcation or an ending of the fingerprint.

7. The biometric authentication device according to claim 5, wherein the biometric information is a vein and the feature point is a bifurcation or an ending of the vein.

8. The biometric authentication device according to claim 1, wherein
   the processing unit further performs extracting function a feature for matching from the biometric input information,
   the storage unit stores a feature for matching extracted from the registered biometric information for each of the plurality of registered biometric information together with identification information of the registered biometric information,
   the matching the biometric input information with the selected registered biometric information by calculating the degree of similarity between the feature for matching extracted from the biometric input information and the feature for matching stored together with the identification information of the selected registered biometric information.

9. A biometric information registration device comprising:
   a biometric information acquiring unit which acquires user's registered biometric information and generates a registered biometric image representing the registered biometric information;
   a storage unit; and
   a processing unit configured to perform a process including:
   dividing the registered biometric image into a plurality of blocks;
   extracting, for each of the plurality of blocks, a local feature representing the geometric feature of the registered biometric information contained in the block;
   classifying the plurality of blocks into a plurality of groups by blocks with a similar local feature;
   extracting, for each of the plurality of groups, a first group feature representing the feature of the registered biometric information contained in the group; and
   storing the first group feature extracted for each of the plurality of groups in the storage unit together with identification information of the registered biometric information.

10. A biometric authentication method comprising:
    acquiring user's biometric input information and generating a biometric input image representing the biometric input information;
    dividing the biometric input image into a plurality of blocks;
    extracting, for each of the plurality of blocks, a local feature representing a geometric feature of the biometric input information contained in the block;
    classifying the plurality of blocks into the plurality of groups by blocks with a similar local feature;

extracting, for each of the plurality of groups, a second group feature representing the feature of the biometric input information contained in the group;

calculating, from the plurality of groups set for the biometric input image and the plurality of groups set for each of a first prescribed number of the registered biometric images stored in a storage unit, a difference between a first group feature representing the feature of the registered biometric information in the group in the registered biometric image and the second group feature, for each group with the similar local feature;

calculating, depending on the difference, the degree of difference between each of the plurality of registered biometric information and the biometric input information, and selecting a second prescribed number, which is smaller than the first prescribed number, of registered biometric information in the ascending order of the degree of the difference; and matching the selected registered biometric information with the biometric input information.

11. The biometric authentication method according to claim 10, wherein the local feature is a feature which is invariable with respect to the position and rotation of the biometric input information on the biometric input image.

12. The biometric authentication method according to claim 11, wherein the biometric information is a fingerprint, and the local feature is a curvature of a ridge line or a valley line of the fingerprint contained in each of the plurality of blocks.

13. The biometric authentication method according to claim 11, wherein the biometric information is a vein pattern, and the local feature is the number of veins contained in each of the plurality of blocks or the ratio of pixels representing a vein to each of the plurality of blocks.

14. The biometric authentication method according to claim 10, wherein the first group feature and the second group feature are the number of feature points of biometric information contained in each of the plurality of groups per unit area.

15. The biometric authentication method according to claim 14, wherein the biometric information is a fingerprint and the feature point is a bifurcation or an ending of the fingerprint.

16. The biometric authentication method according to claim 14, wherein the biometric information is a vein and the feature point is a bifurcation or an ending of the vein.

17. The biometric authentication method according to claim 1, further comprising:
   extracting a feature for matching from the biometric input information, and wherein
   the matching the selected registered biometric information with the biometric input information matches the biometric input information with the selected registered biometric information by calculating the degree of similarity between the feature for matching extracted from the biometric input information and the feature for matching of the selected registered biometric information.

18. A non-transitory computer-readable recording medium in which a computer program for biometric authentication is recorded, the computer program for causing a computer to execute a process comprising:
   dividing a biometric input image representing user's biometric input information generated by a biometric information acquiring unit into a plurality of blocks;
   extracting, for each of the plurality of blocks, a local feature representing a geometric feature of the biometric input information contained in the block;
   classifying the plurality of blocks into a plurality of groups by blocks with a similar local feature;
   extracting, for each of the plurality of groups, a second group feature representing the feature of the biometric input information contained in the group;
   calculating, from the plurality of groups set for the biometric input image and the plurality of groups set for each of a first prescribed number of the registered biometric images stored in a storage unit, a difference between a first group feature representing the feature of the registered biometric information in the group in the registered biometric image and the second group feature, for each group with the similar local feature;
   calculating, depending on the difference, the degree of difference between each of the plurality of registered biometric information and the biometric input information, and selecting a second prescribed number, which is smaller than the first prescribed number, of registered biometric information in the ascending order of the degree of the difference; and
   matching the selected registered biometric information with the biometric input information.

19. A biometric authentication device comprising:
   an input unit which acquires user's user identification information;
   a biometric information acquiring unit for acquiring biometric input information of a user and generating a biometric input image representing the biometric input information;
   a storage unit which stores, a feature for matching extracted from a registered biometric image representing registered biometric information of at least one registered user which is preregistered, and stores, for each of a plurality of groups, a first group feature representing a feature of registered biometric information contained in the group, the plurality of groups being obtained by dividing the registered biometric image representing the registered biometric information of the registered user into a plurality of blocks, and classifying the plurality of blocks so that blocks which contain geometric features of the registered biometric information which are similar to each other, are classified into a same group; and
   a processing unit configured to perform a process including:
   dividing the biometric input image into a plurality of blocks;
   extracting, for each of the plurality of blocks in the biometric input image, a local feature representing the geometric feature of the biometric input information contained in the block;
   classifying the plurality of blocks in the biometric input image into the plurality of groups by blocks with the similar local feature;
   extracting, for each of the plurality of groups in the biometric input image, a second group feature representing the feature of the biometric input information contained in the group;
   calculating, for groups with the similar local feature among the plurality of groups set for the biometric input image and a plurality of groups set for the registered biometric image specified by the user identification information, a difference between the second group feature and the first group feature, and calculating the degree of difference between the biometric input information and the registered biometric information depending on the difference, and when the degree of difference is equal to or larger than a predetermined threshold, judging that the biometric input information does not match the registered biometric information; and matching, when the degree of difference is lower than the predetermined threshold, matches the biometric input information with the registered biometric information specified by the user identification information.

* * * * *